(12) United States Patent
Comer et al.

(10) Patent No.: US 7,212,300 B2
(45) Date of Patent: May 1, 2007

(54) PRINTING SYSTEMS ACCESSIBLE FROM REMOTE LOCATIONS

(75) Inventors: Michael Comer, Mansfield, TX (US); Robert Bison, Arlington, TX (US)

(73) Assignee: Illinois Tool Works, Inc., Glenview, IL (US)

( * ) Notice: Subject to any disclaimer, the term of this patent is extended or adjusted under 35 U.S.C. 154(b) by 873 days.

(21) Appl. No.: 09/828,462

(22) Filed: Apr. 6, 2001

(65) Prior Publication Data

US 2003/0095157 A1    May 22, 2003

(51) Int. Cl.
*G06F 15/00* (2006.01)
*G06F 15/16* (2006.01)

(52) U.S. Cl. .................... 358/1.15; 358/1.15; 709/219

(58) Field of Classification Search .............. 358/1.15, 358/1.13, 442; 709/218, 202, 219, 232, 229, 709/238; 347/85, 86, 3, 104; 707/1, 9; 400/74, 400/61, 611
See application file for complete search history.

(56) References Cited

U.S. PATENT DOCUMENTS

| | | | |
|---|---|---|---|
| 5,154,761 A | 10/1992 | Cooke et al. | |
| 5,160,535 A | 11/1992 | Cooke et al. | |
| 5,329,293 A | 7/1994 | Liker | |
| 5,329,306 A | 7/1994 | Carlotta | |
| 5,406,315 A | 4/1995 | Allen et al. | |
| 5,463,415 A | 10/1995 | McCann et al. | |
| 5,489,925 A | 2/1996 | Brooks et al. | |
| 5,623,292 A | 4/1997 | Shrivastava et al. | |
| 5,680,519 A | 10/1997 | Neff | |
| 5,710,582 A | 1/1998 | Hawkins et al. | |
| 5,784,083 A | 7/1998 | Schumann et al. | |
| 5,831,649 A | 11/1998 | Watrobski et al. | |
| 5,890,774 A | 4/1999 | Schwartz et al. | |
| 5,908,251 A | 6/1999 | Buckby | |
| 5,910,810 A | 6/1999 | Brooks et al. | |
| 6,007,190 A | 12/1999 | Murray et al. | |
| 6,025,925 A | 2/2000 | Davidson, Jr. et al. | |
| 6,027,195 A | 2/2000 | Gauthier et al. | |
| 6,027,204 A | 2/2000 | Hirano et al. | |
| 6,027,207 A | 2/2000 | Reinten et al. | |
| 6,039,430 A | 3/2000 | Helterline et al. | |
| 6,170,007 B1 * | 1/2001 | Venkatraman et al. | 709/218 |
| 6,296,353 B1 * | 10/2001 | Thielman et al. | 347/86 |
| 2002/0044296 A1 * | 4/2002 | Skaanning | 358/1.14 |
| 2002/0070988 A1 * | 6/2002 | Desormeaux | 347/8 |

OTHER PUBLICATIONS

Specifically Referencing Column 8, Lines 29-46.
1) Information taken from www.foxjet.com, FOX JET an ITW Company, Information about FOXJET.
2) Information taken from www.netsilicon.com, NETSILICON—Legal Information.
3) Information taken from www.netsilicon.com, NETSILICON—Integrated Hardware/Software Solutions for Device Networking.

* cited by examiner

Primary Examiner—King Y. Poon
Assistant Examiner—Saeid Ebrahimi
(74) Attorney, Agent, or Firm—Niro, Scavone, Haller & Niro

(57) ABSTRACT

Printers, such as drop-on-demand printers with piezoelectric printheads, having Internet as well as Intranet connectivity capabilities are provided, resulting in numerous service, maintenance and cost efficiencies.

20 Claims, 55 Drawing Sheets

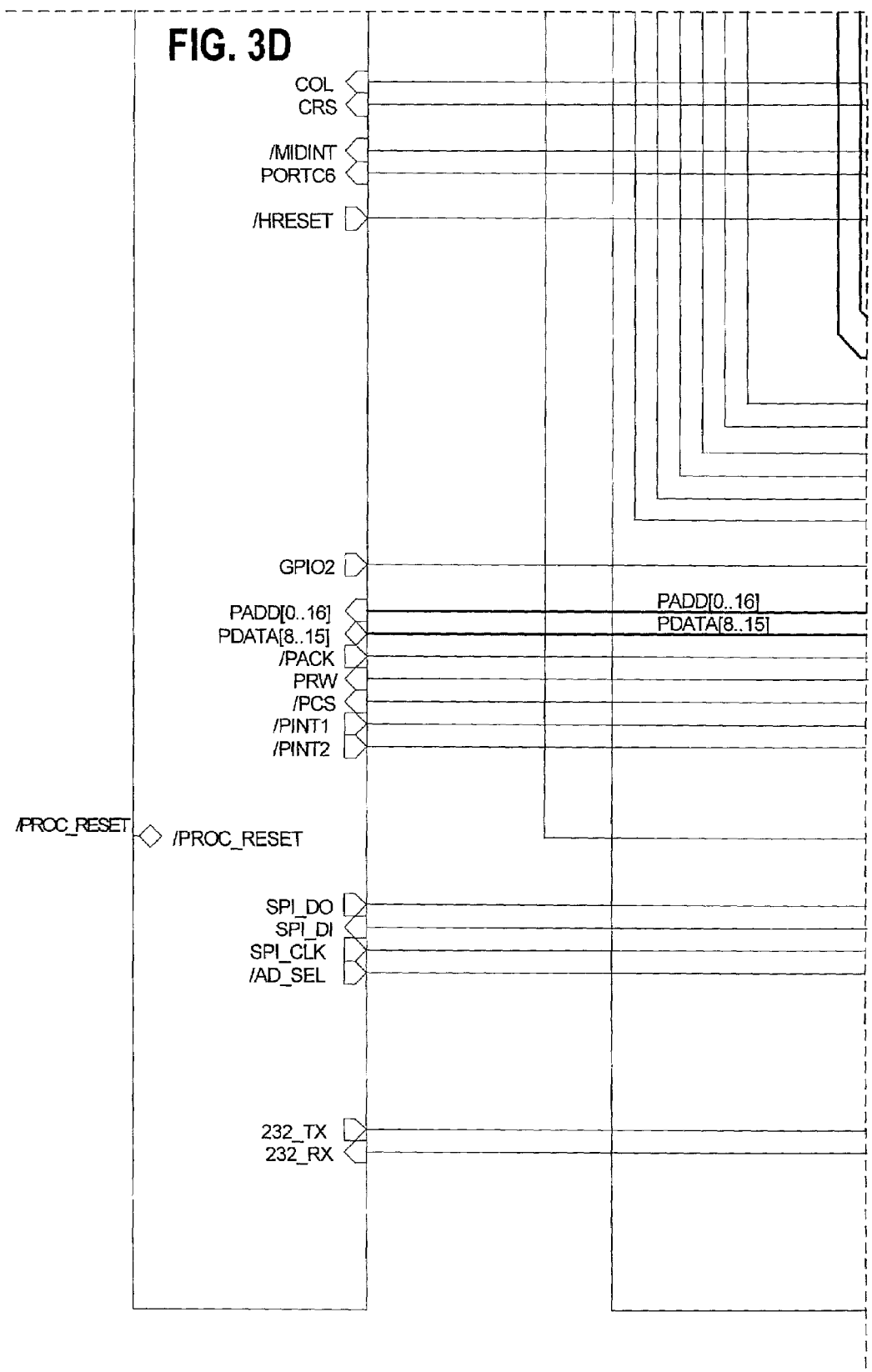

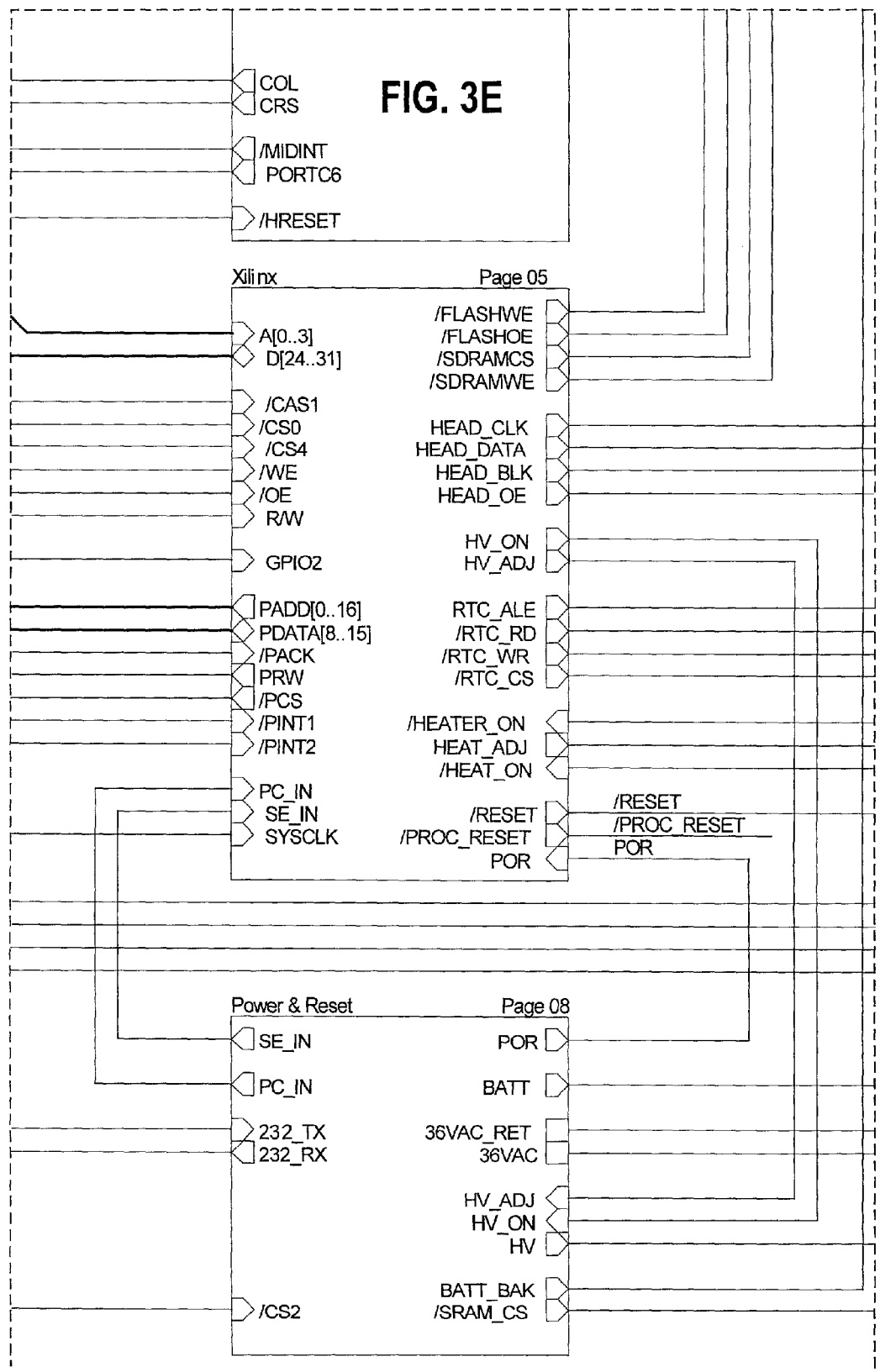

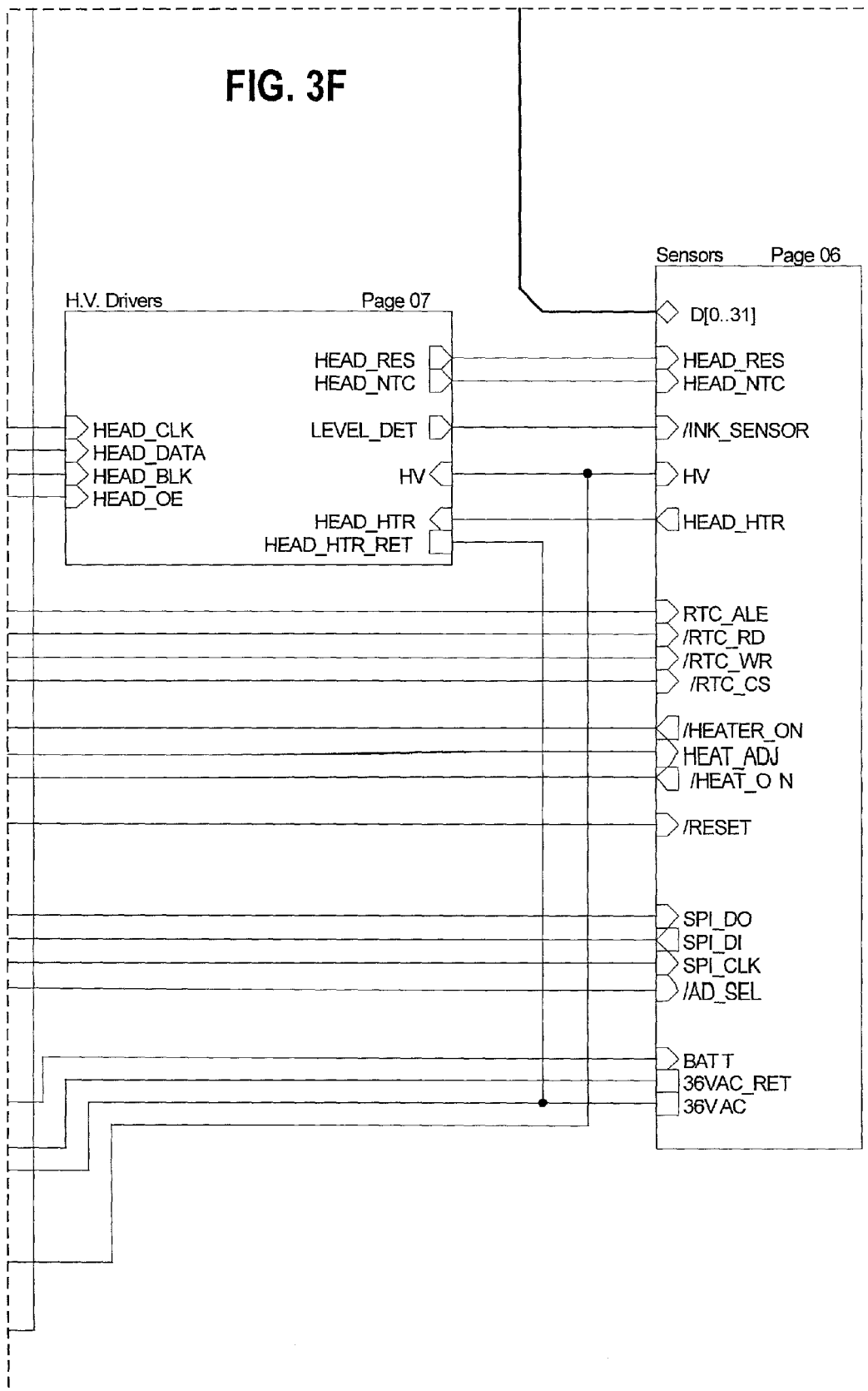

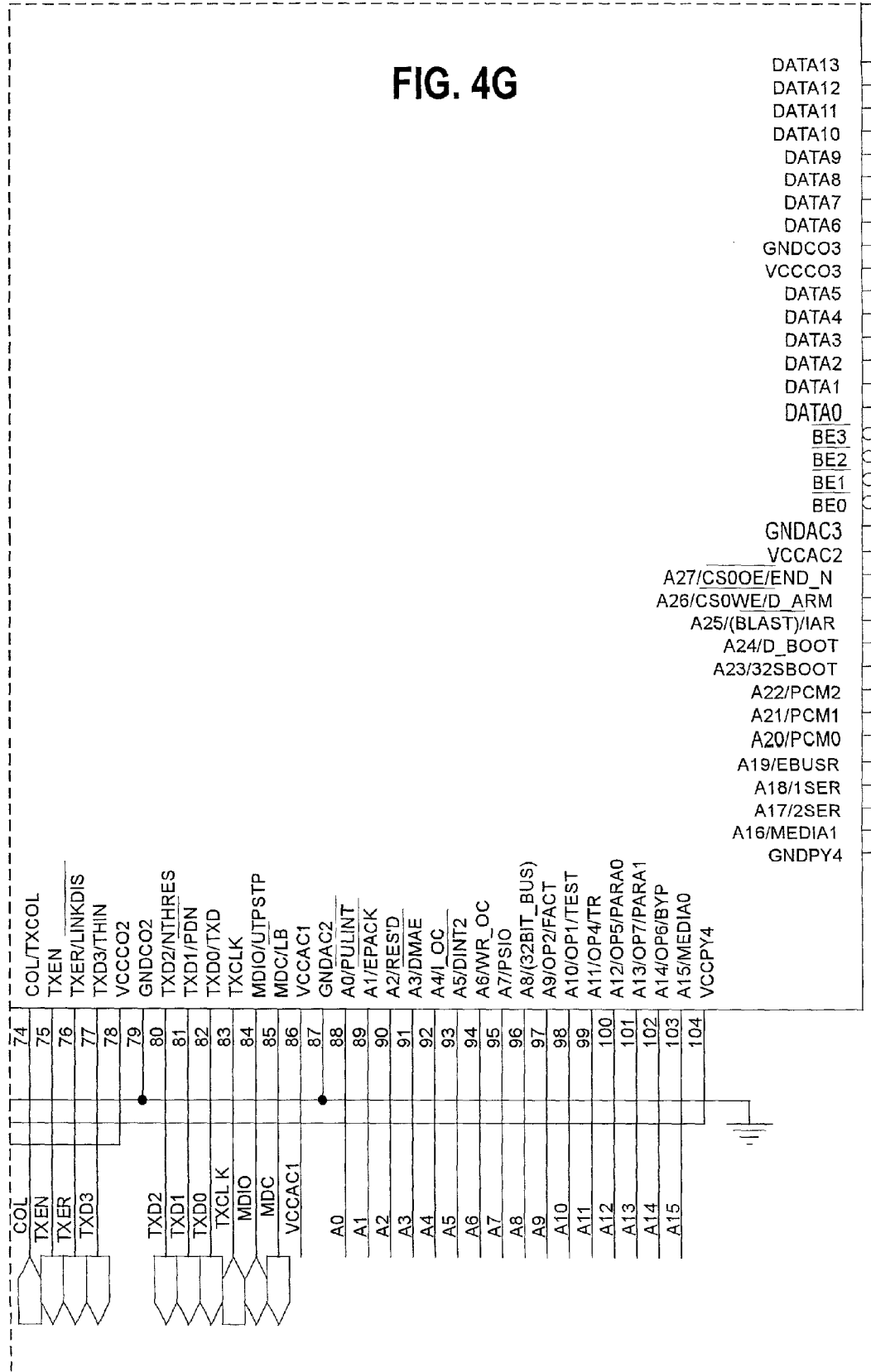

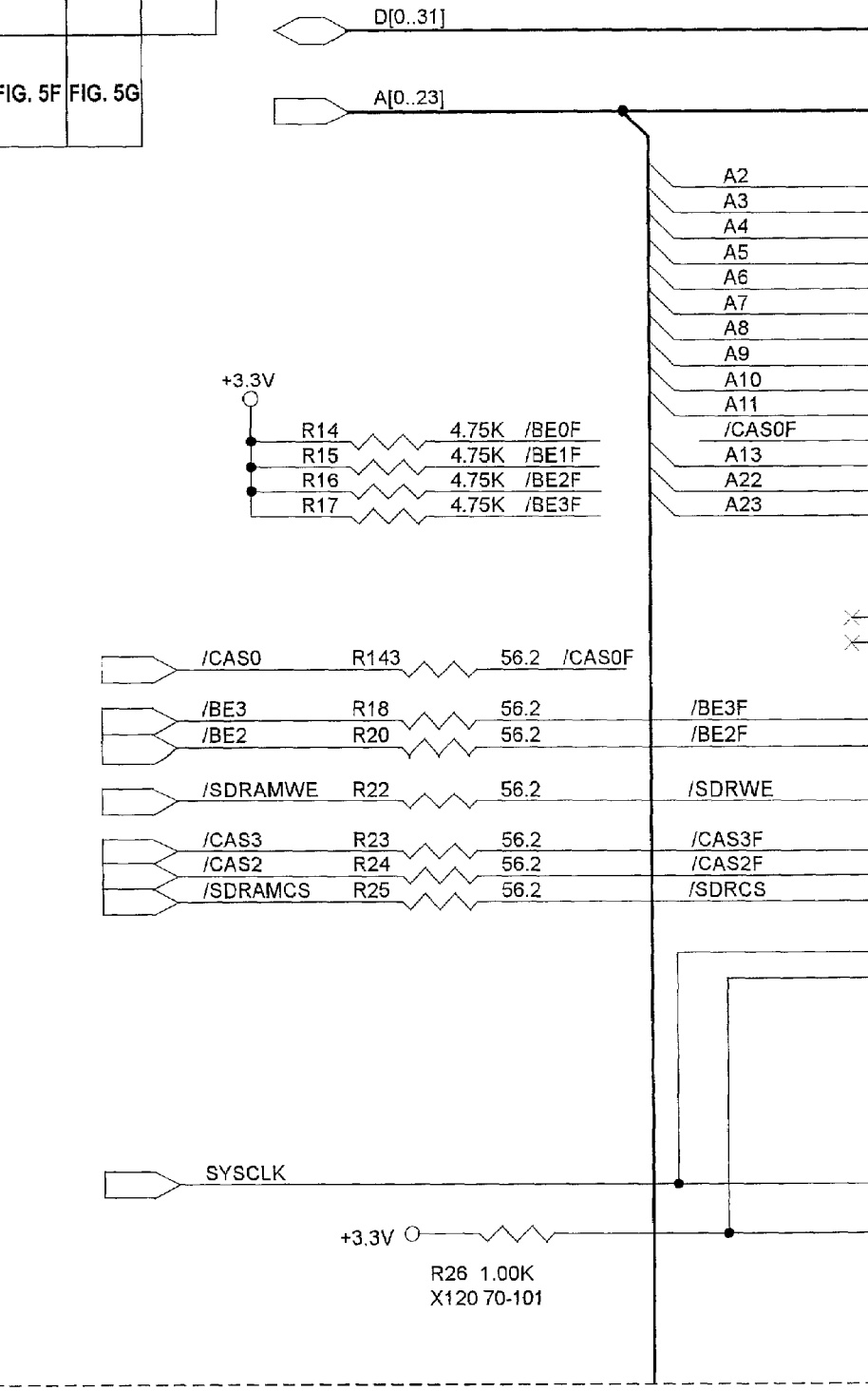

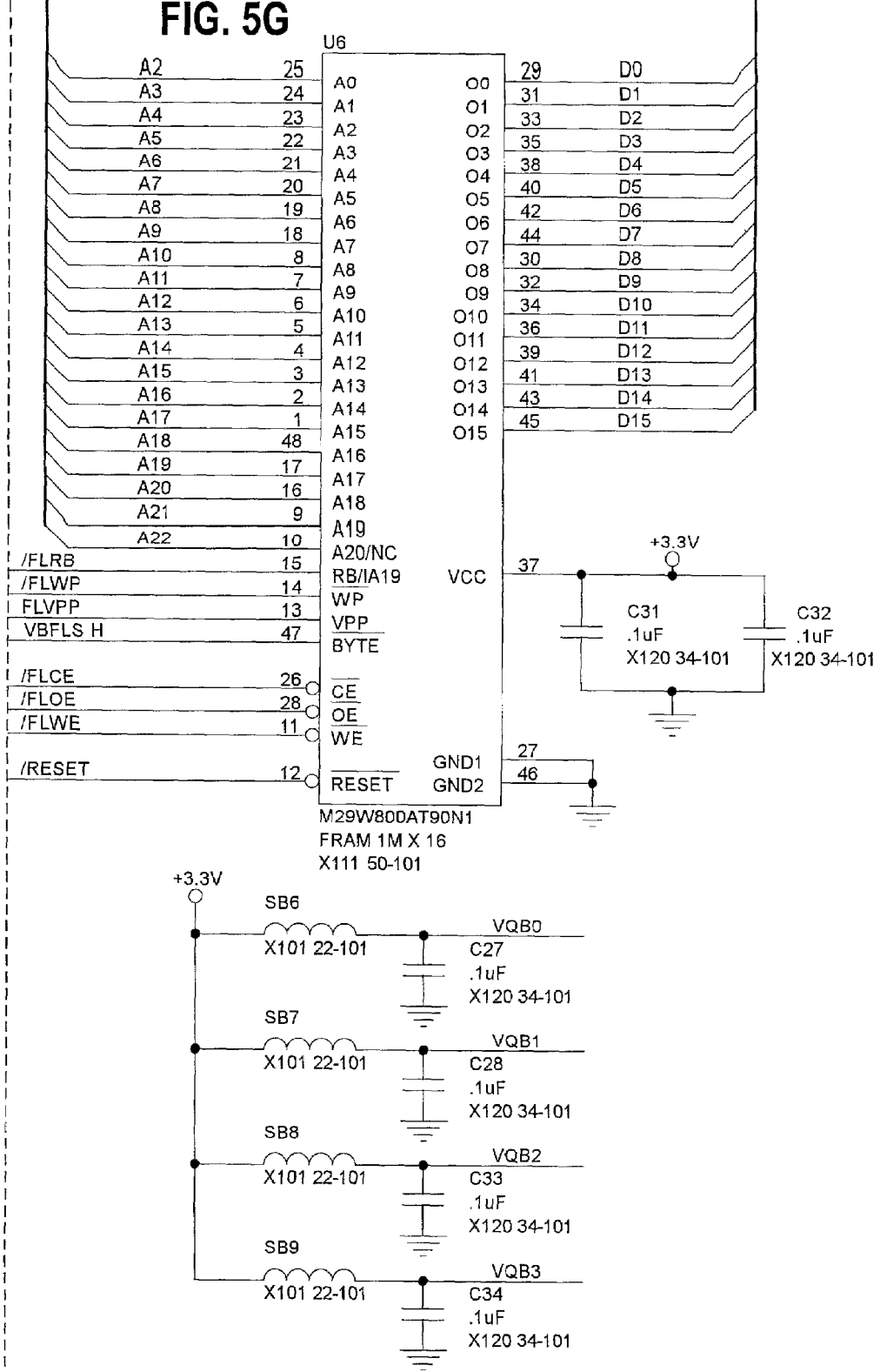

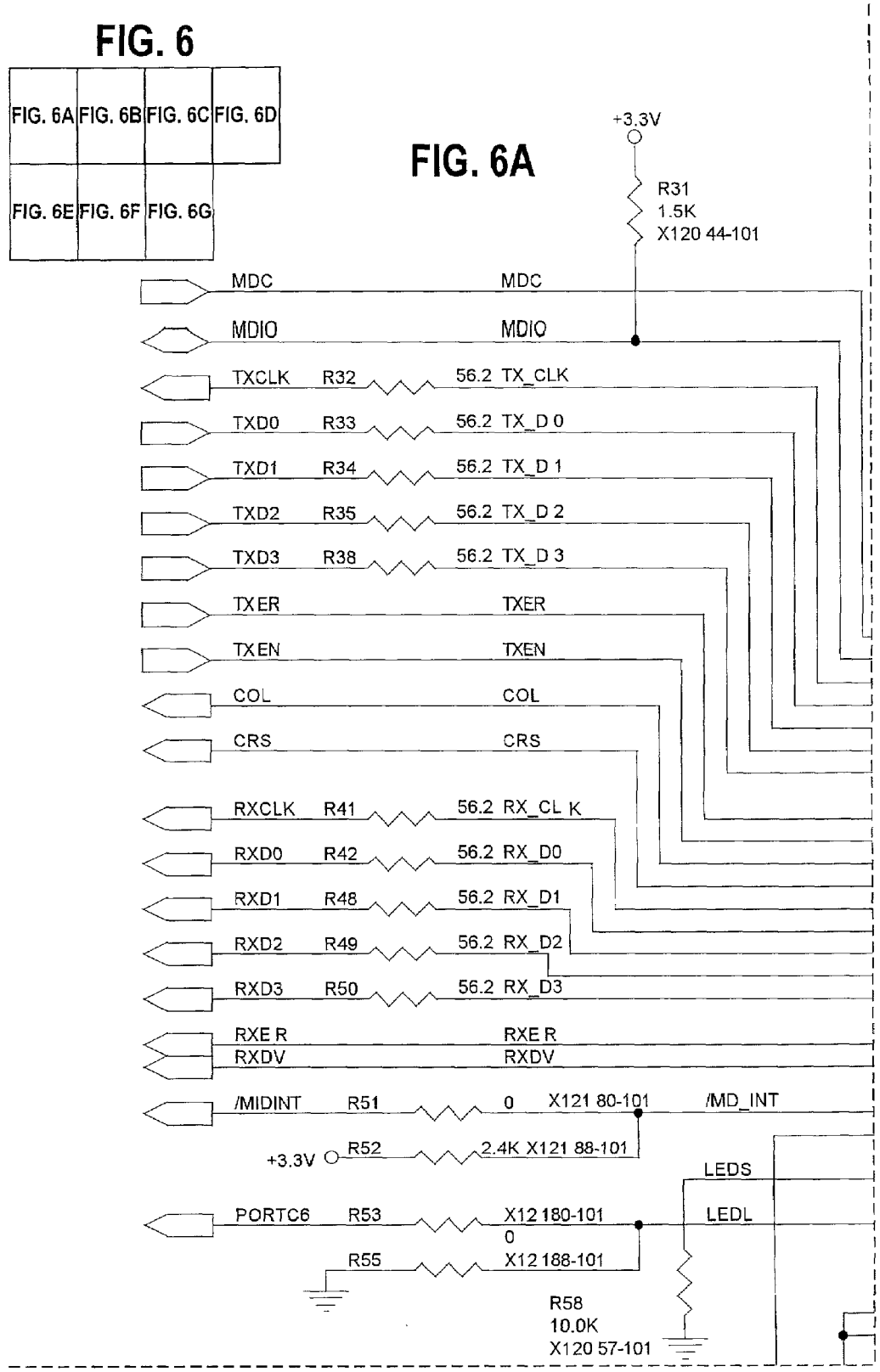

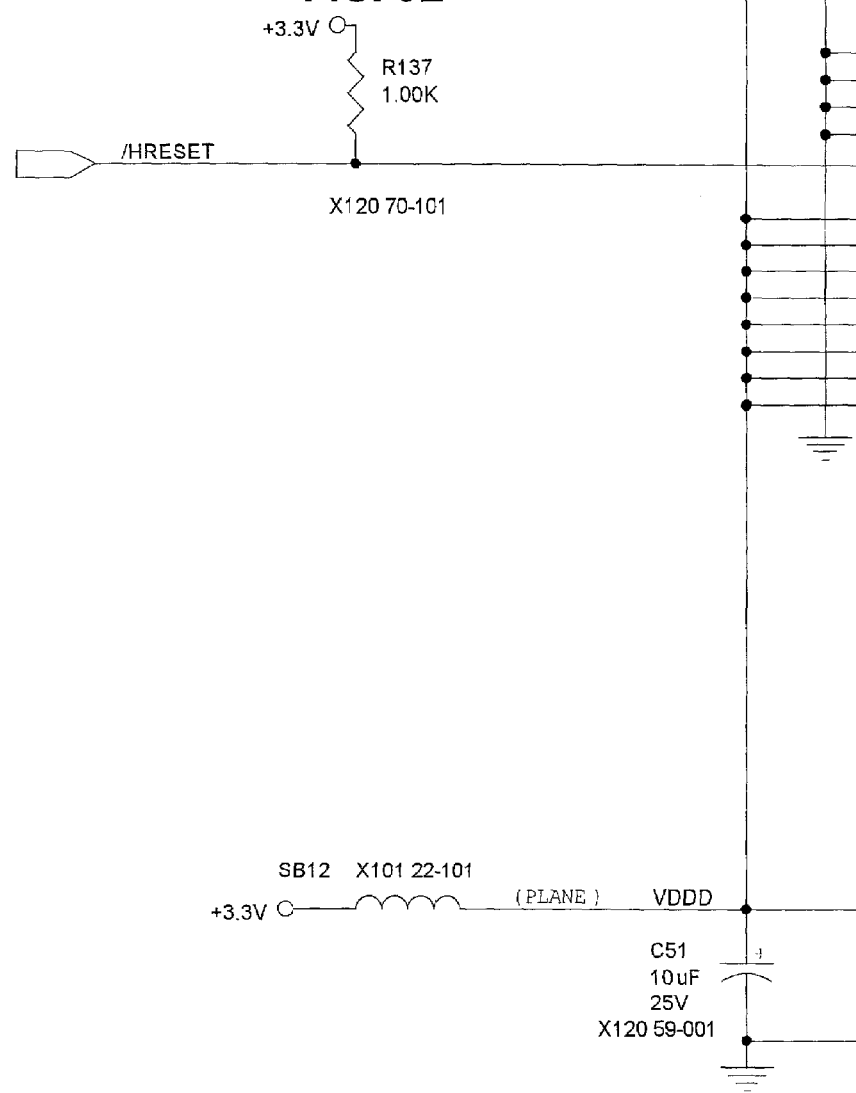

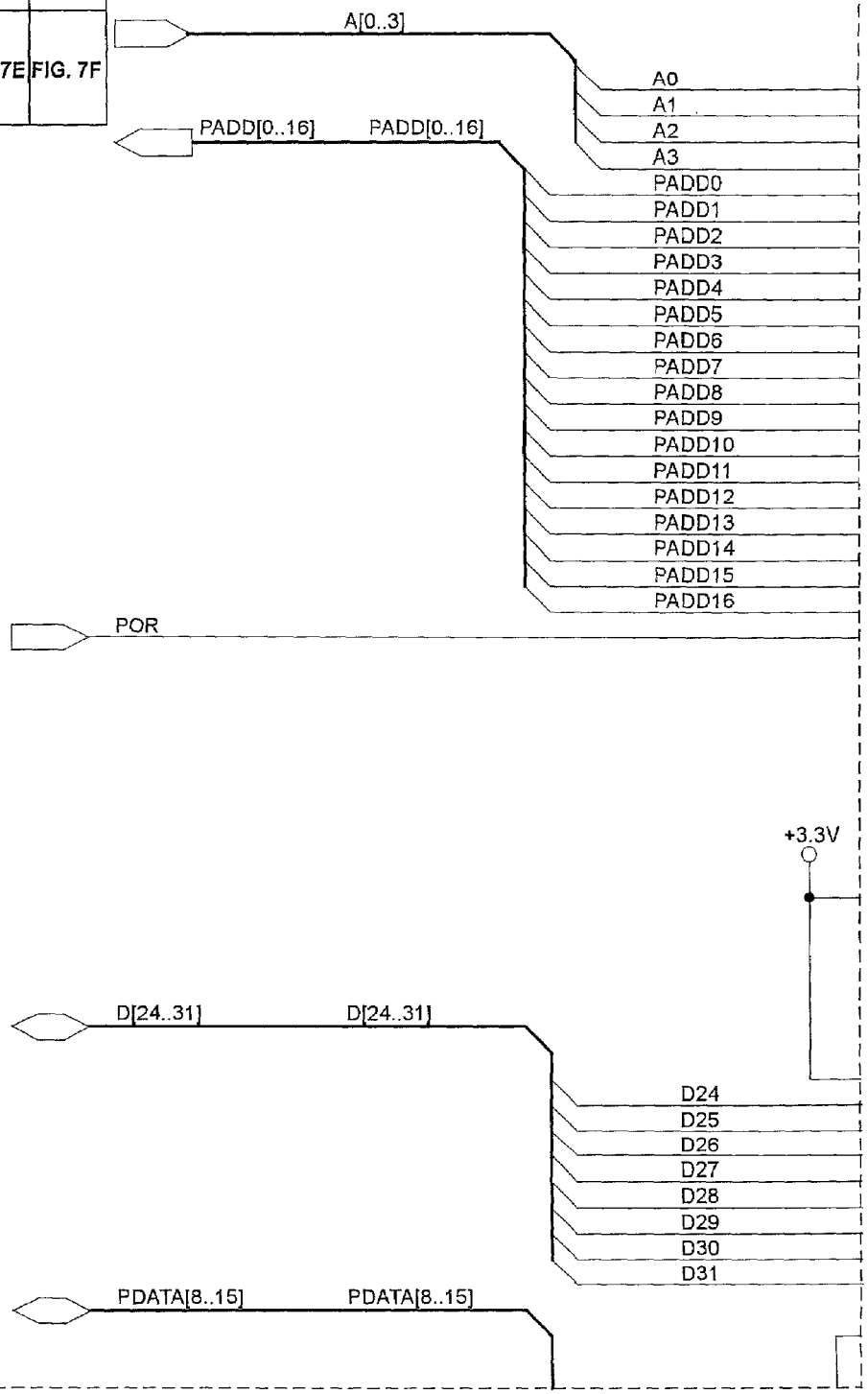

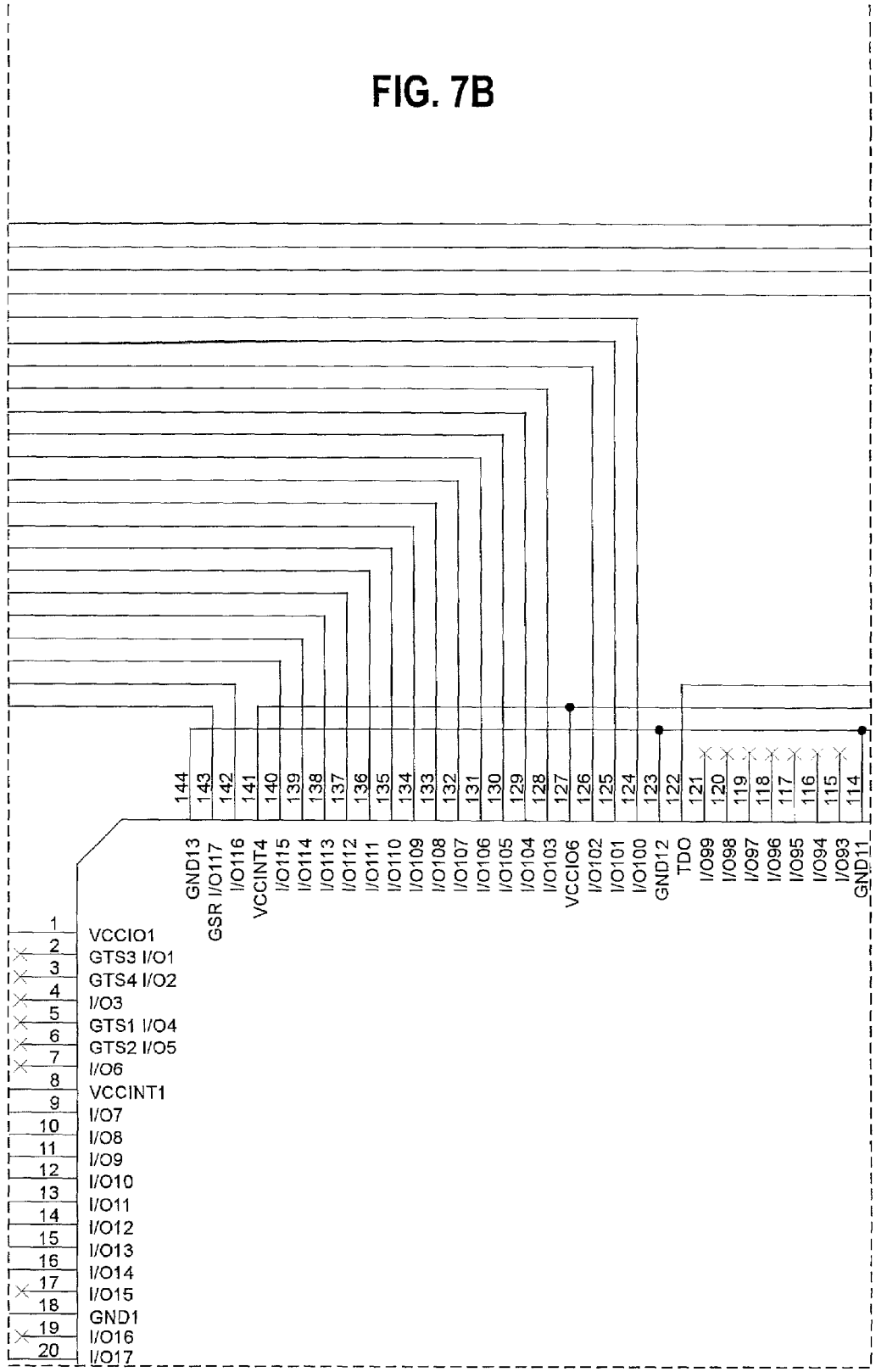

FIG. 8C
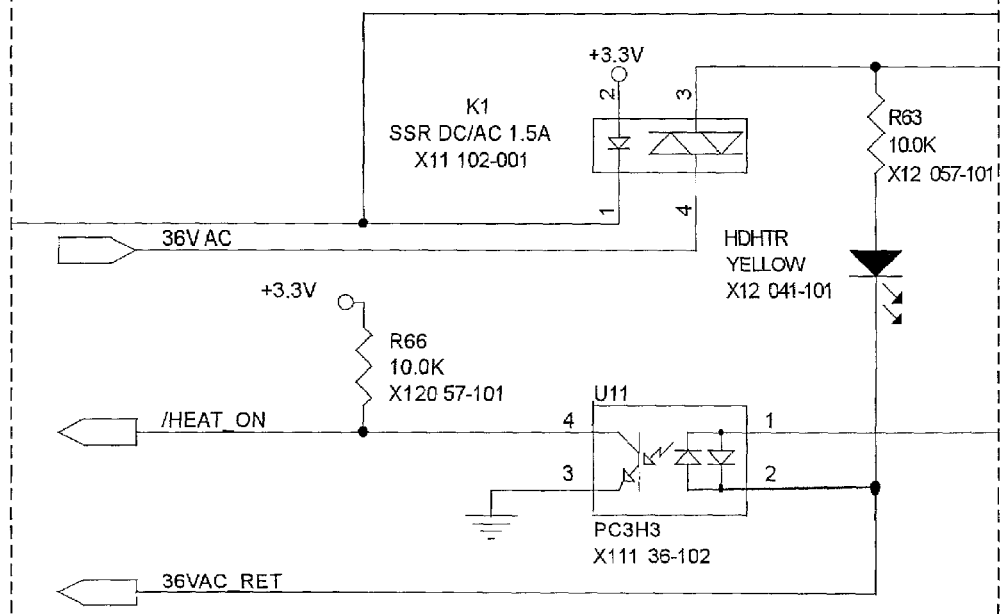
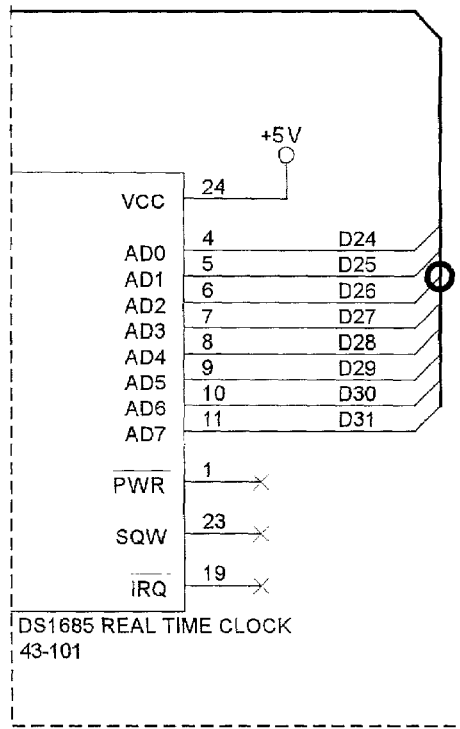
DS1685 REAL TIME CLOCK
43-101

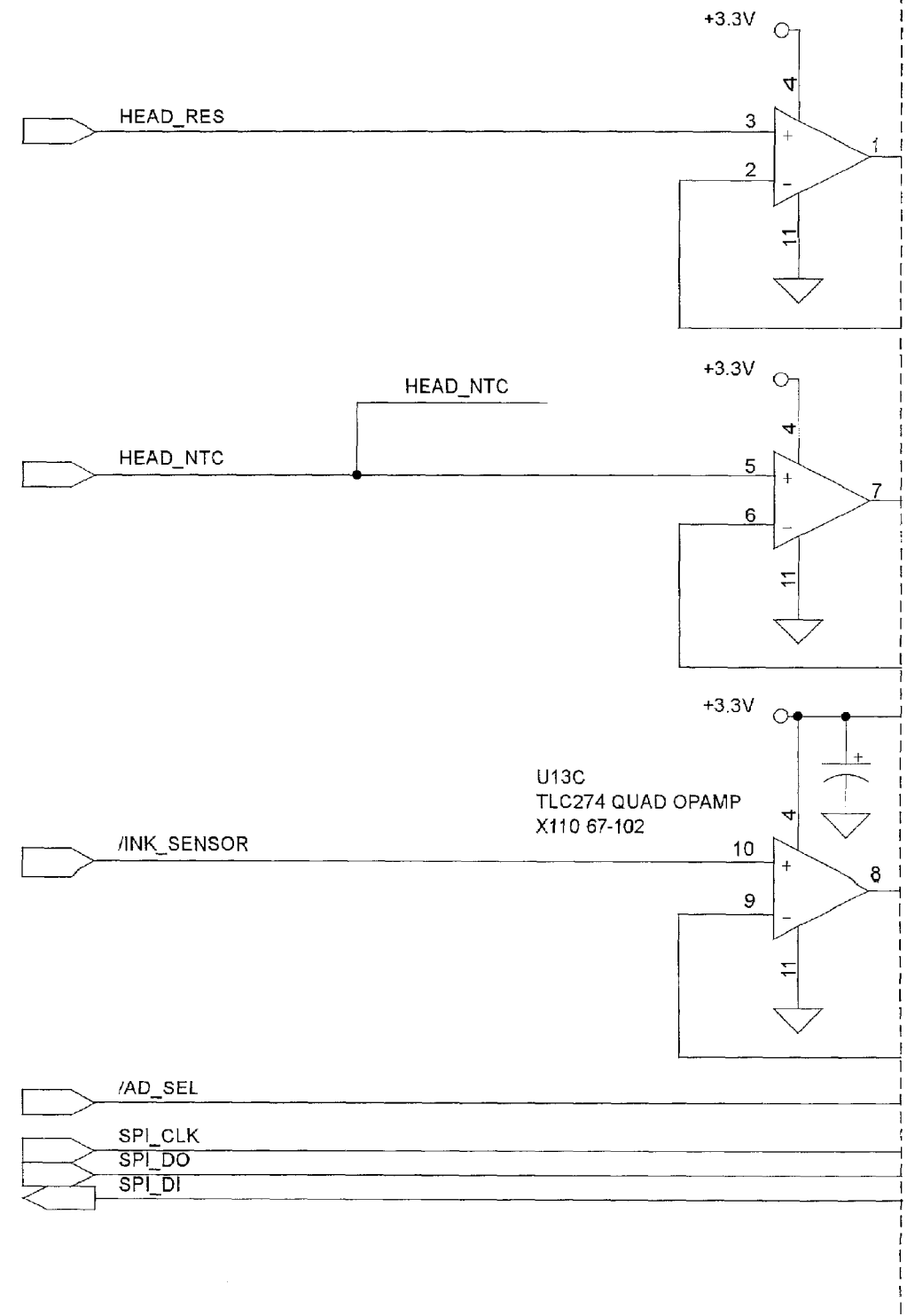

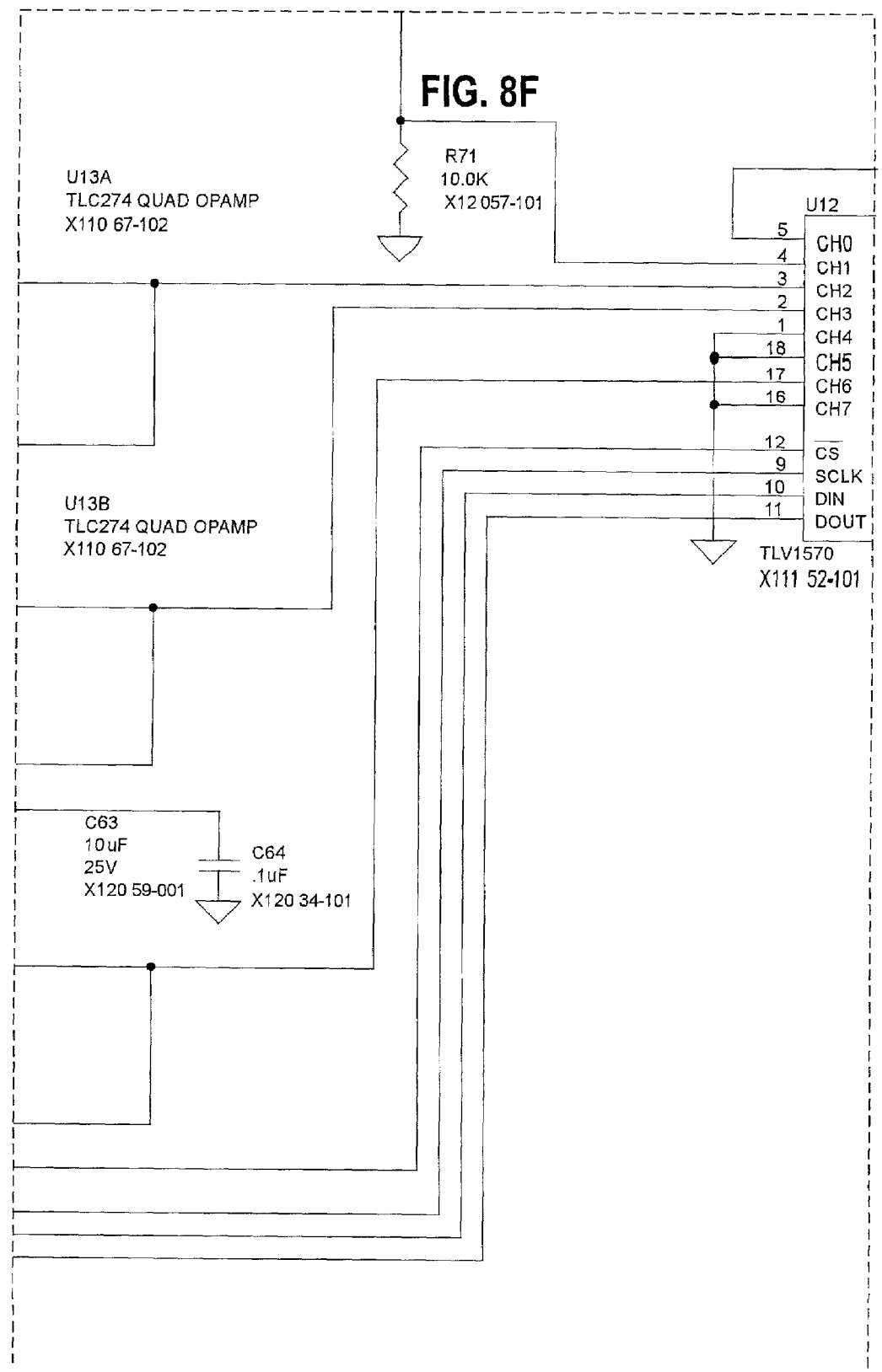

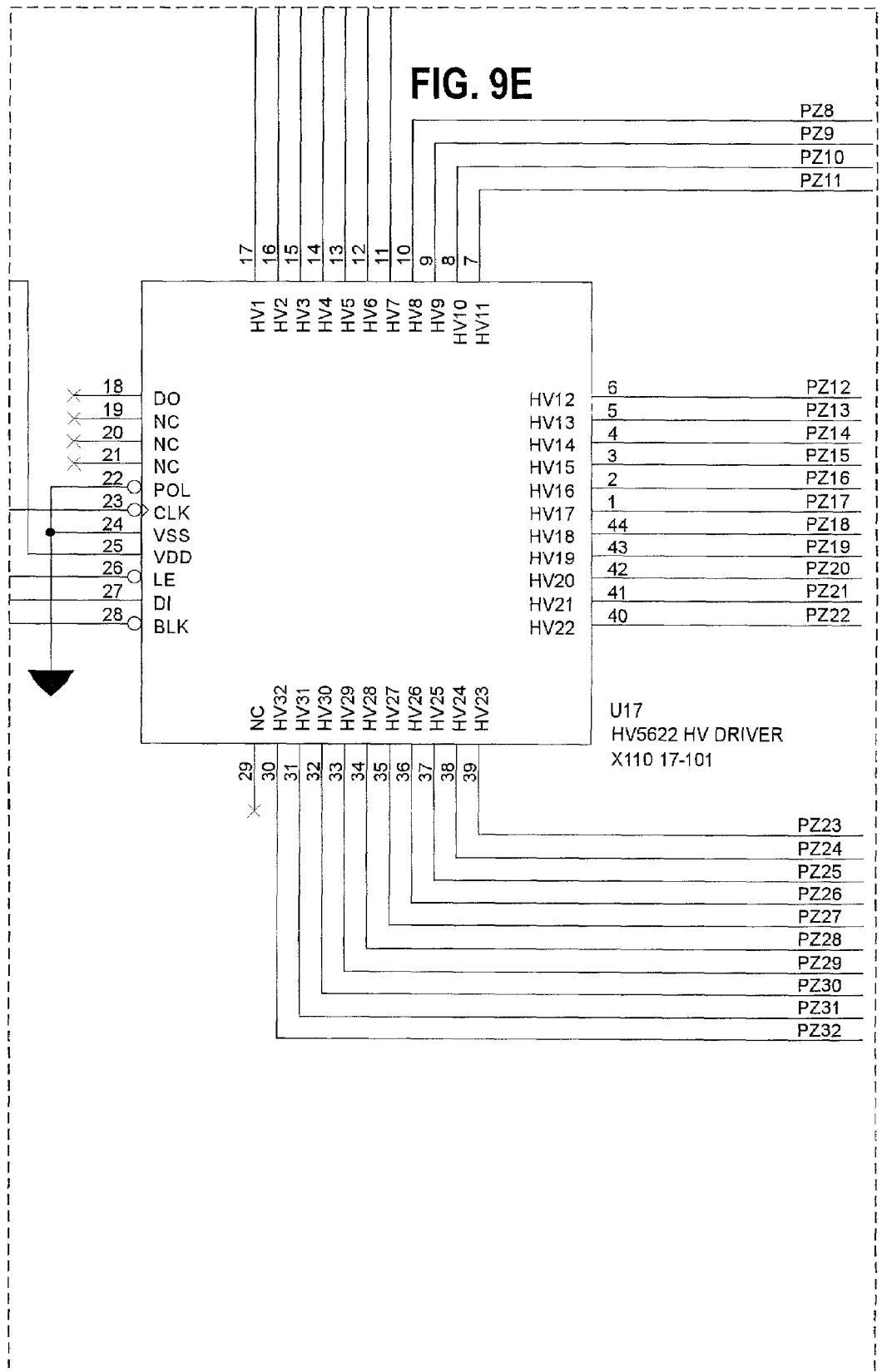

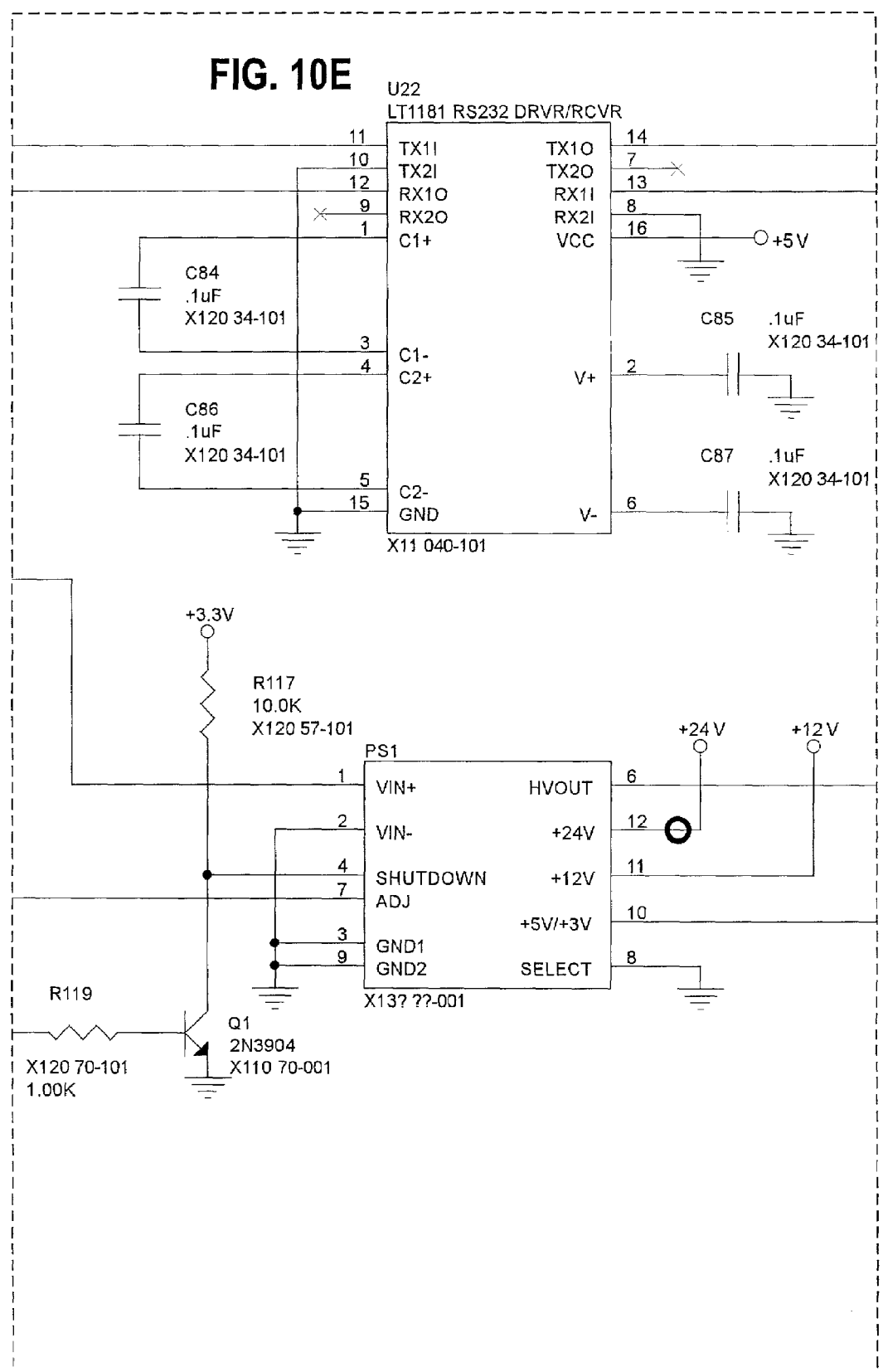

PRINTING SYSTEMS ACCESSIBLE FROM REMOTE LOCATIONS

BACKGROUND OF THE INVENTION

The invention generally relates to printing systems, such as industrial ink jet printers, accessible from remote locations such as over the Internet.

Various industrial ink jet printers and software are known in the art, including the FxJet™ printer and corresponding System Master 2000® software manufactured by FoxJet, Inc., owned by Illinois Tool Works, Inc. (ITW). Such printers may be used for coding variable information such as bar codes on substrates such as packaging materials (e.g., the exteriors of corrugated boxes). These printers are known in the industry as "drop-on-demand" printers, and their specifications, functions and uses are well known. In one application, a horizontally stationary drop-on-demand printer is designed to code boxes moving along a horizontally-disposed conveyor. These printers may employ piezoelectric print heads using impulse-type ink jet compositions, such as those available from Trident, Inc., also an ITW Company, as described for example in U.S. Pat. Nos. 5,154,761, 5,160,535 and 5,329,293, each of which is hereby incorporated by reference herein. Piezoelectric print heads contain piezoelectric crystals which lengthen in response to an applied voltage, thereby dispensing ink.

Ink jet printers typically receive print data from a source, such as a single host computer or a network with at least one host computer and a network server. Network systems allow sources within that network to control and keep track of printers and printing information. See, e.g., U.S. Pat. No. 6,025,925, assigned to Lexmark International, Inc., incorporated herein by reference. Currently, for industrial piezoelectric print engines in this industry, control electronics, including both software and hardware, typically support between one to four print heads. These control electronics must be replicated if it is desired to use more than four print heads at a given site or for a given application. Thus, a not insubstantial hardware investment is required to control multiple industrial printers running at a given location.

Maintenance and service of conventional printers also requires on-site supervision. If the printer could be provided with an embedded server and be connected directly to servers on the Internet ("Internet connectivity"), such as servers controlled by service and/or manufacture technicians, for example, overall system cost could be reduced, and a number of servicing and maintenance advantages would result, as mentioned below.

It is believed that diagnostic software communicating over hardwire connections (phone lines using dial-up machines) has been used in the past to monitor printing equipment, having limitations attendant to such systems. However, it is not believed that industrial printers such as drop-on-demand piezoelectric printers have previously been provided with Internet connectivity capabilities. Possible reasons for this include expense, recent technological advances with embedded server technology, and/or the printer industries' focus on stand-alone or networked-only printer systems.

Accordingly, it is an object of the present invention to provide an individual print engine and/or a network of print engines with the ability to be accessed and/or controlled via the Internet.

It is another object of the invention to provide piezoelectric printers with remote control and remote diagnostic capabilities; such self-servicing printer heads would be capable of communicating with servers via the Internet, for example, and be capable of, e.g., automatically reordering supplies such as ink when needed, ordering printhead replacement, gathering and reporting statistics such as on printer use, allowing users to perform online registration for warranty or other purposes, and scheduling maintenance as required.

It is still another object of the invention to provide print engines which are capable of monitoring and gathering data on use and performance history and usage requirements, and reporting this information, such as to the manufacturer; preferably, such printers could access data from other devices connected to the Internet, or control or be controlled by such devices, for these and other purposes.

It is yet another object to provide an ink jet printer having a piezoelectric printing head with an embedded server for constant connection with the Internet and/or with intranet devices, and which also permits lowered costs by reducing hardware requirements.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Chip" means an integrated microcircuit.

"Internet hardware" means hardware used to provide a printer with Internet connectivity.

"Internet software" means software used to provide a printer with Internet connectivity.

"Microprocessor" means a miniaturized processor performing various functions, including that of a central processing unit.

"Print engine" means a functioning, Internet-connected printer, including Internet and printer hardware and software necessary to provide same.

"Printer hardware" means hardware used to operate a printer.

"Printer software" means software used to operate a printer.

"Substrate" means any material upon which printing may occur, whether or not fast or slow drying inks or other materials are used, including paper, glass or other materials which may be used as substrates.

"Valid IP address" means an address that the Internet currently recognizes.

SUMMARY OF THE INVENTION

The objects mentioned above, as well as other objects, are solved by the present invention, which overcomes disadvantages of prior art printing systems, while providing new advantages not previously obtainable with such systems.

In a particularly preferred embodiment, a print engine may be provided with Internet connectivity. The print engine may be an impulse-type ink jet printer having a piezoelectric print head. The print engine may also be another printers, such as a continuous ink jet printer or a wax printer. Printheads other than piezoelectric may be used, such as valve jet printheads or those using electrostatics. Jet fluids other than ink may be used to print on non-traditional substrates, such as DNA reagents on slides.

In a preferred embodiment, the print engine includes printer hardware and software providing a functioning printer with the ability to dispense information onto a substrate. Internet hardware and software are also include, and provide the printer with Internet connectivity. The Internet hardware preferably includes a microprocessor communicating with the printer hardware and software. The microprocessor, which consist of a single chip, is an embedded Internet server having a valid IP address. The chip may include Ethernet MAC and system controllers for (e.g.) memory, DMA, interrupts and timers. The chip may also include cache, I/O, real time operating systems, device driver software and communications protocol software. The print engine may also include integrated networking software.

In a preferred embodiment, the printer software stores one or more valid IP addresses of servers providing maintenance or service for one or more components of the print engine.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 1:
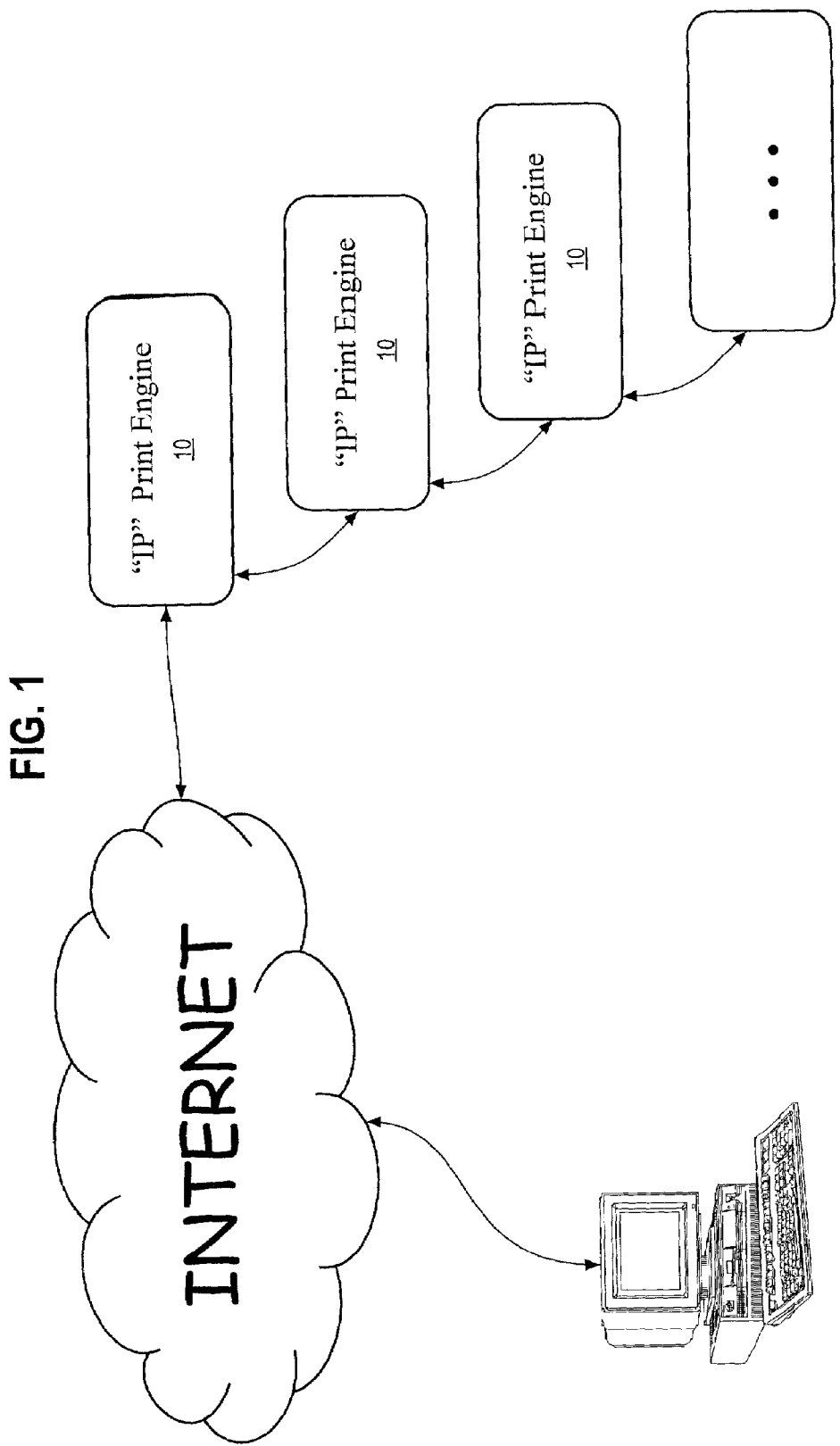
FIG. 1 is a schematic view of the overall system set-up of a preferred embodiment of the present invention.

According to the present invention, as shown for example in FIG. 1, information may be remotely conveyed over the Internet between work stations and industrial piezoelectric print engines, using conventional web browsers such as Netscape® or Internet Explorer® which display web pages in the HTML language, for example. A widely used, local area network (LAN) technology known as the Ethernet may be used for this purpose. A specific, preferred embodiment of such a system is now described.

Still referring to FIG. 1, in a preferred embodiment, a drop-on-demand piezoelectric printer or print engine 10 is connected to the Internet. Print engine 10 includes: (1) hardware and software required to establish the Internet connection ("Internet hardware" and "Internet software", respectively); and (2) hardware and software required to operate a piezoelectric drop-on-demand printhead ("printer hardware" and "printer software", respectively). Internet hardware may include a microprocessor with hardware for use with an Ethernet topology. Internet software is also required to implement the Internet protocol, and may be provided by NetSilicon, Inc., as further discussed below.

Figure 2:
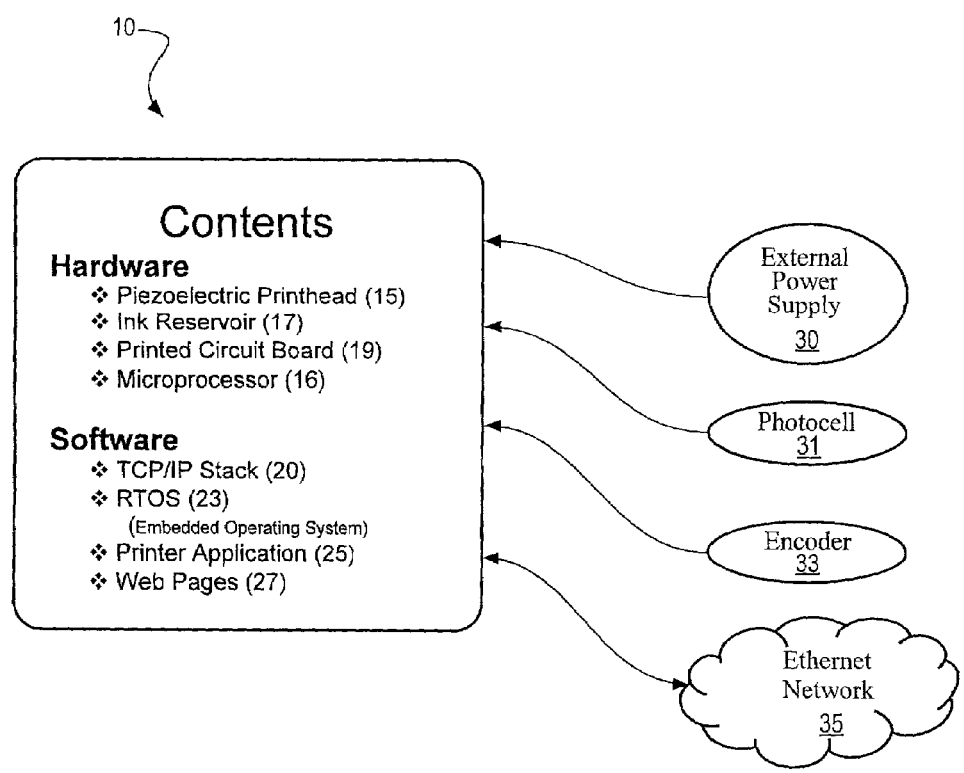
FIG. 2 is a schematic view of the hardware and software components of a preferred embodiment of a printer according to the present invention.

Referring to FIG. 2, a typical preferred system may include a NetSilicon Ethernet processor 16. The processor may have ROM and RAM memory used to run software that will operate the Internet connection and perform the tasks required by the piezoelectric printhead. Processor 16 controls print engine 10 by managing the Internet communications and also by transforming message data received from the Internet into a format readable by the printer software.

Print engine 10 preferably includes an Ethernet transceiver and magnetics that provide the physical connection to the Internet. Print engine 10 also includes specific electronics that are typical in the industry for operating a piezoelectric printhead. Print engine 10 monitors Internet communications and processes data intended for the device. In addition, the print engine performs the typical functions required of a piezoelectric printhead.

Still referring to FIG. 2, typical printer hardware includes a printhead 15, an ink reservoir 17, and a printed circuit board 19. Typical printer software includes a printer software application 25 capable of generating appropriate web pages 27. Print engine 10 may also include a photocell 31 for identifying when a product is in a position to be encoded, and an encoder 33 for synchronizing the speed of the printer and that of the product to be encoded. Print engine 10 may be connected to an external power supply 30. In addition, print engine 10 can communicate over an Ethernet network 35 using an RTOS embedded operating system 23 available from NetSilicon, and a TCP/IP (Transmission Control Protocol/Internet Protocol) network protocol 20. (TCP/IP is a set of communication procedures and standards that provide a basis for interconnecting dissimilar computers.) Embedded Linux or NetSilicon's NET+OS platform comprising ThreadX RTOS and Green Hills development tools may be used for this purpose.

To provide Internet connectivity to print engine 10, an Ethernet microprocessor may be used, such as the NET+ARM™ available from NetSilicon. This Ethernet processor integrates a 32-bit ARM® processor, Ethernet MAC, DMA controllers, I/O, timers, etc., onto a single chip. The operating system and all of the networking software, protocols and services are also integrated onto the chip. This chip is "embedded" into print engine 10 using known techniques, allowing it to connect to the network via Ethernet, thereby providing Ethernet and Internet connectivity for print engine 10. Once connected, the print engine may be managed, serviced and accessed from any site supporting Internet access.

Figure 3:
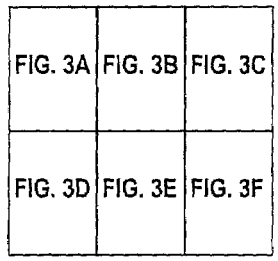
FIGS. 3–10 illustrate circuit diagrams for the microprocessor (FIG. 3) and for various other components used to provide a functioning piezoelectric printer with Internet connectivity, as further described below.
Figure 3A:
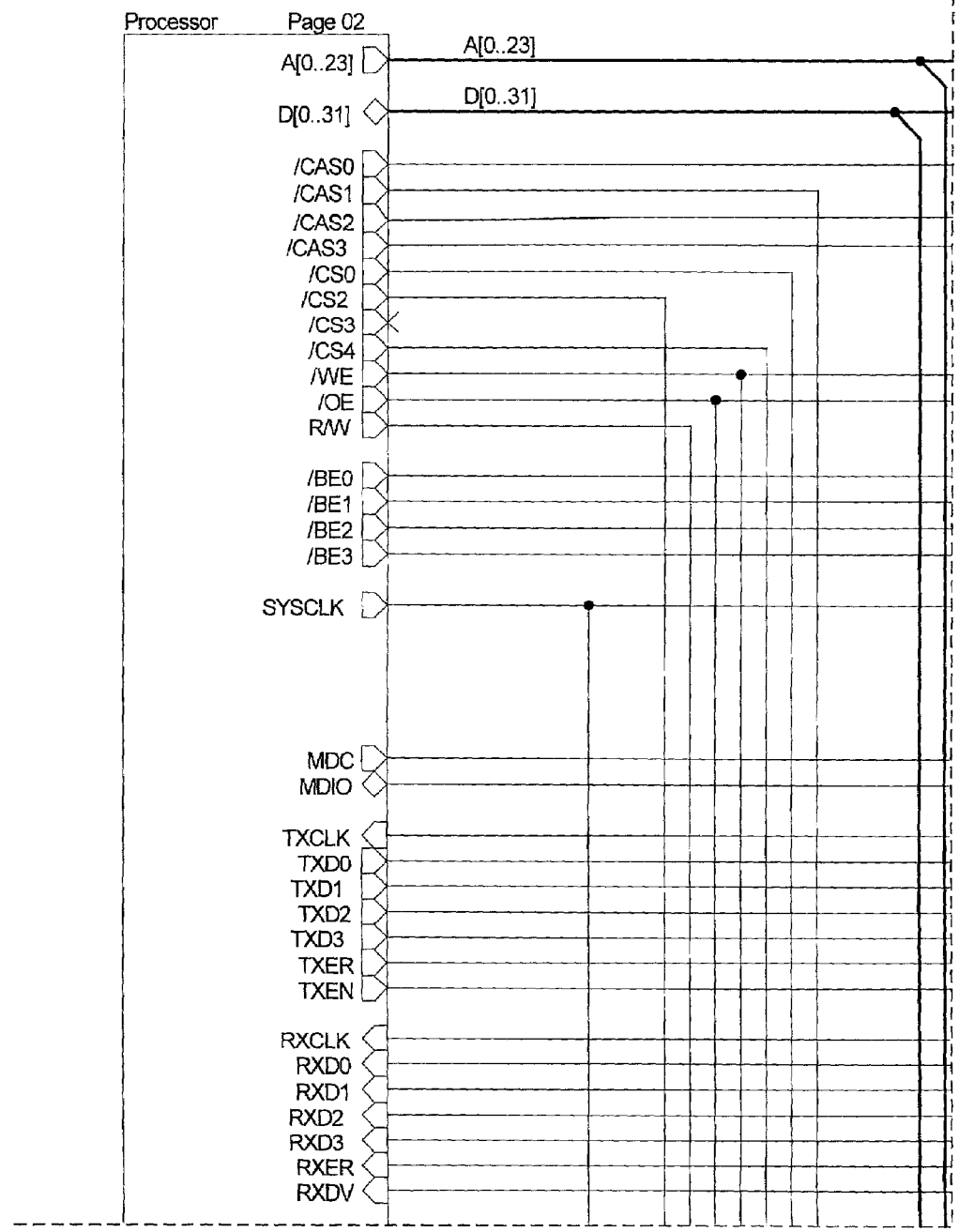
Figure 3B:
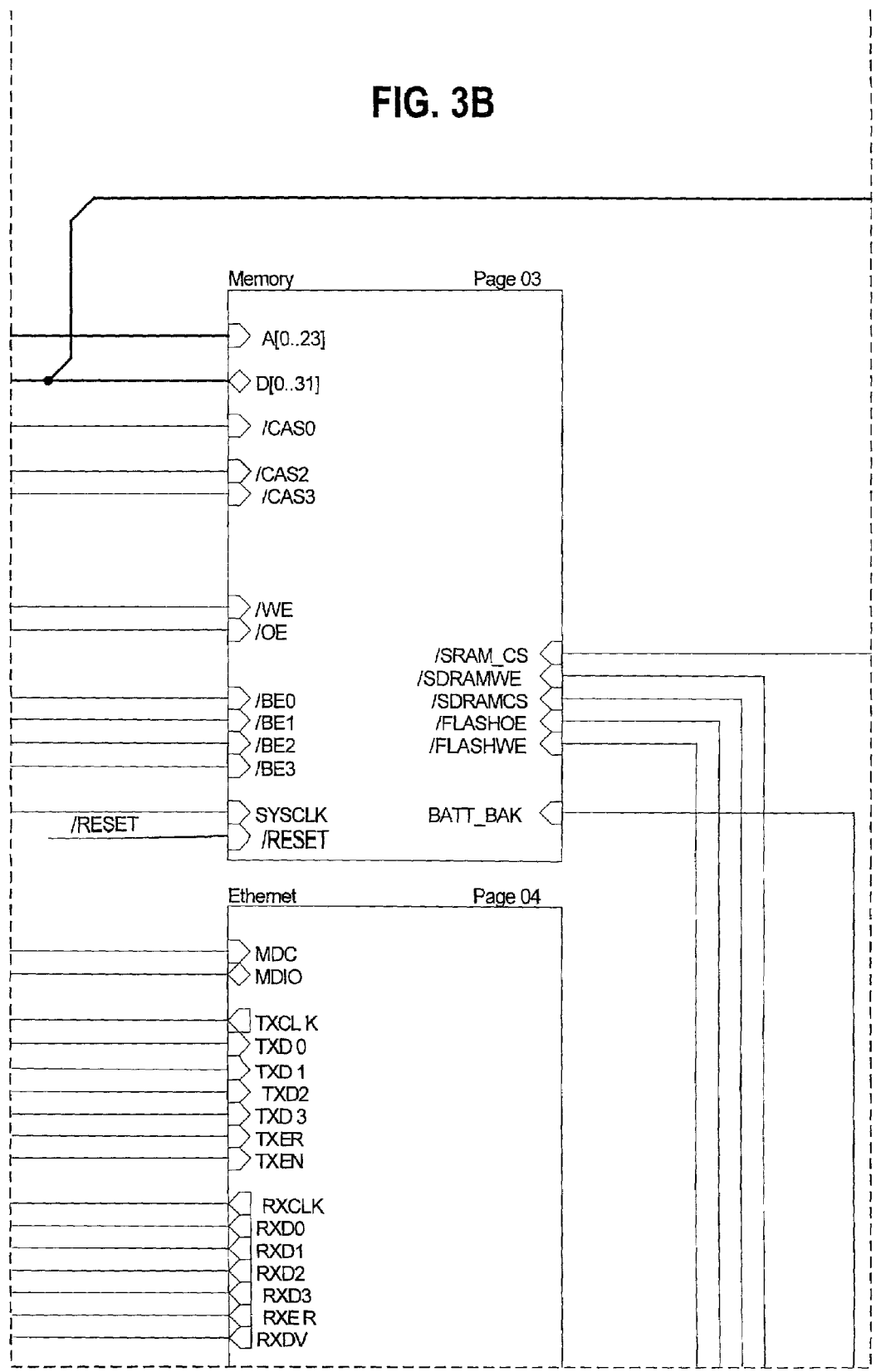
Figure 3C:
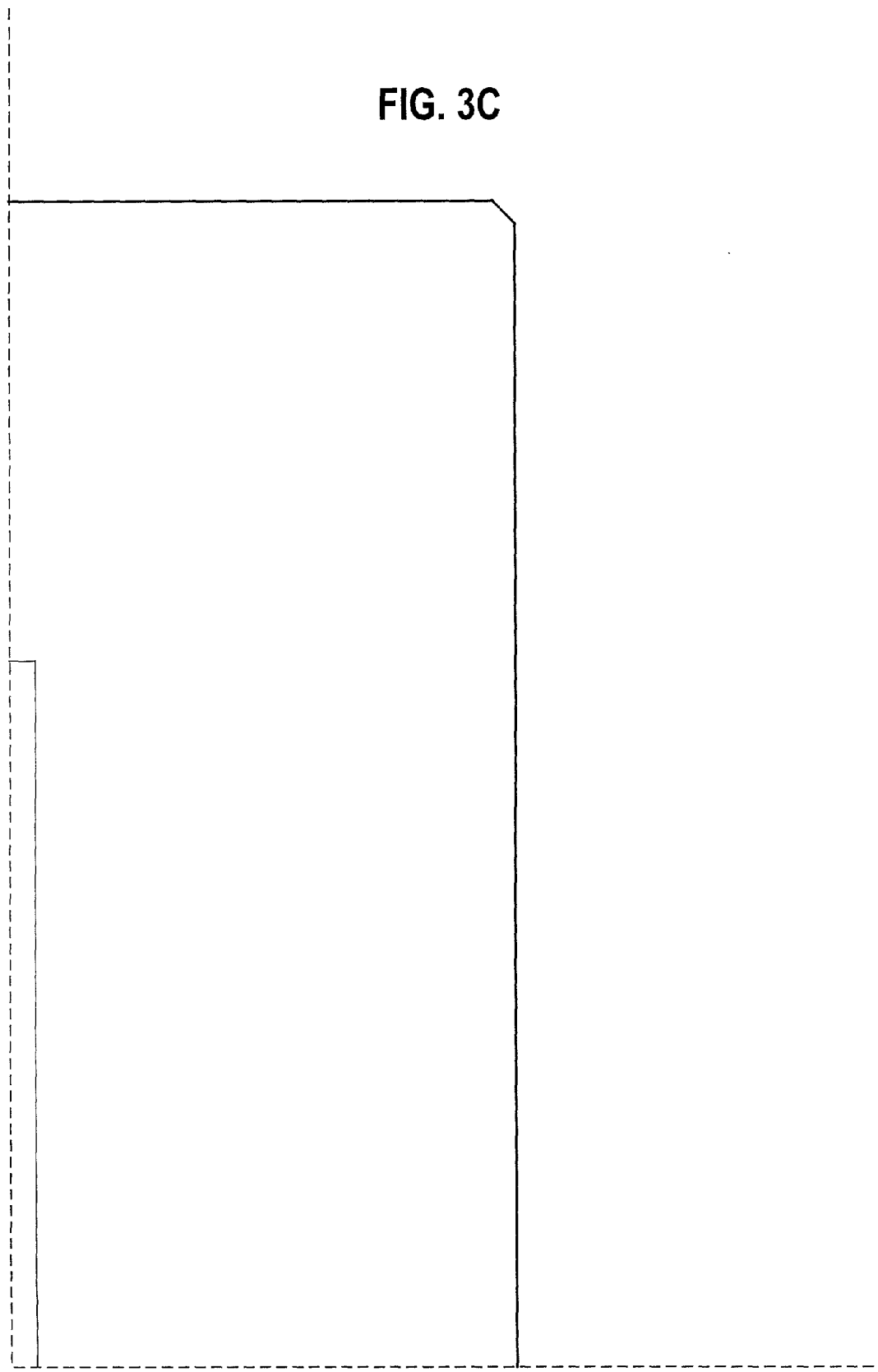
Figure 4:
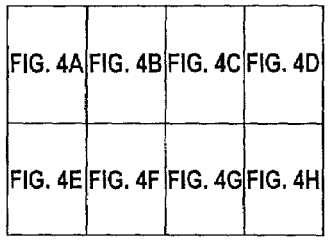
Figure 4A:
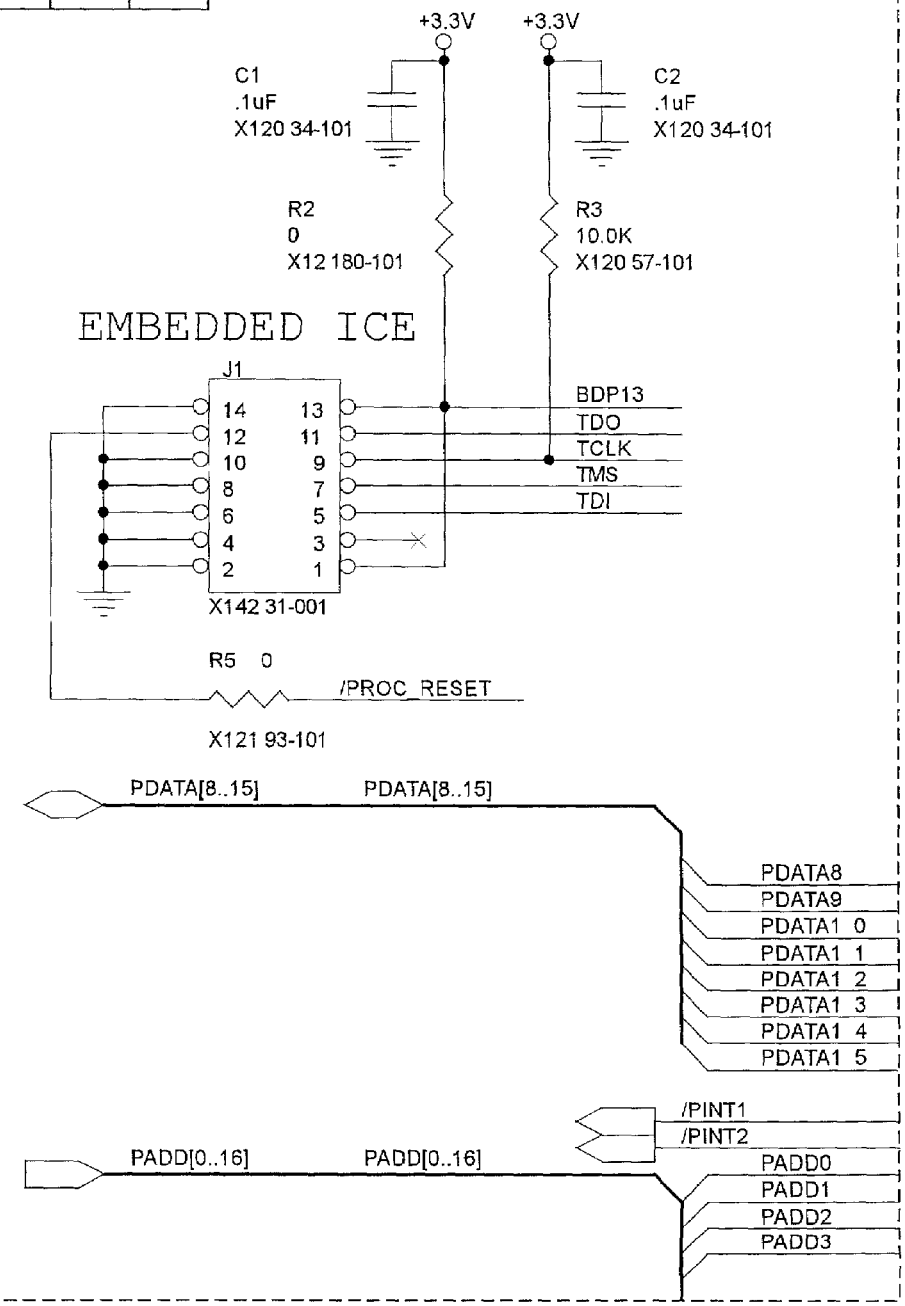
Figure 4B:
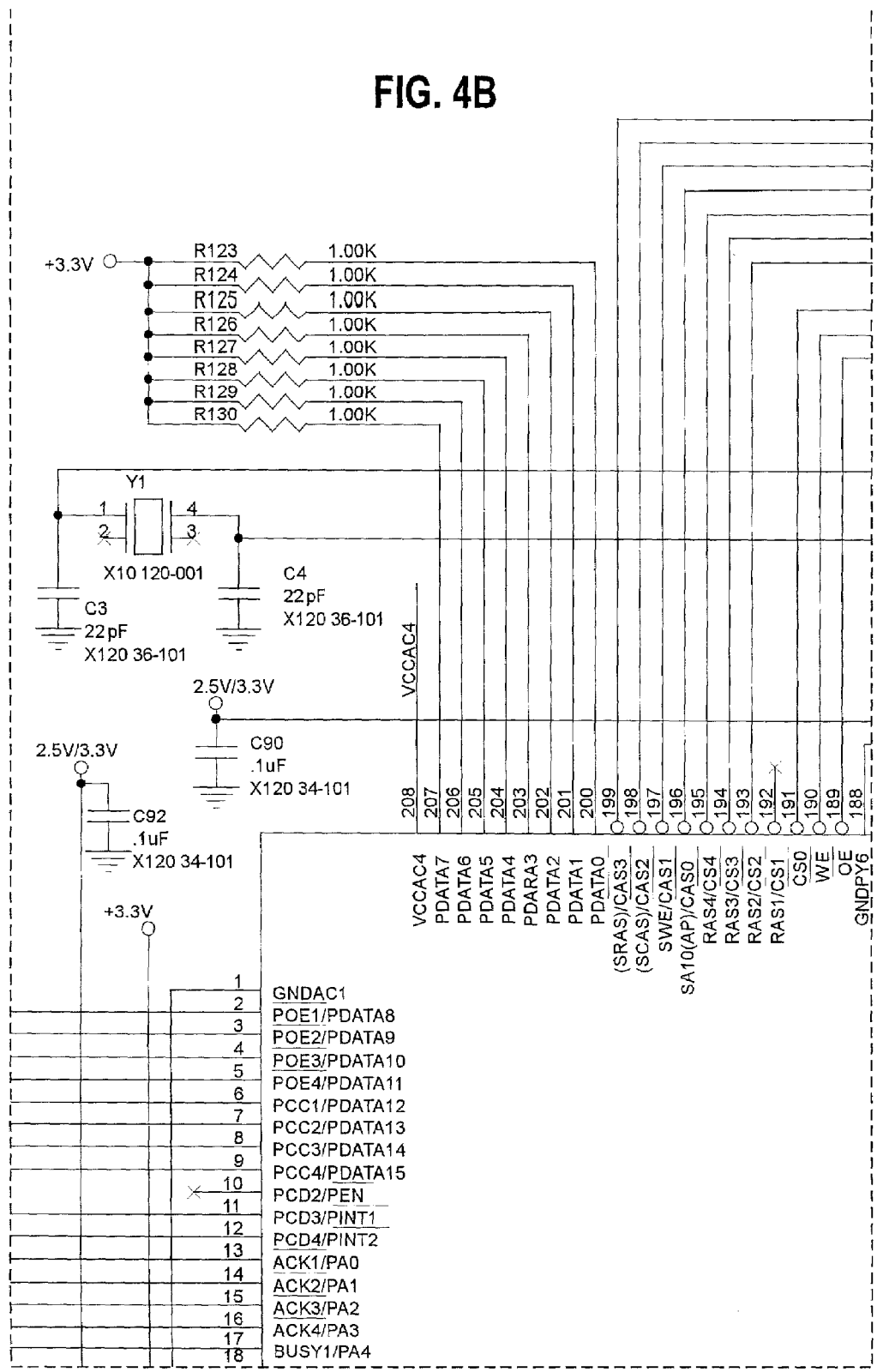
Figure 4C:
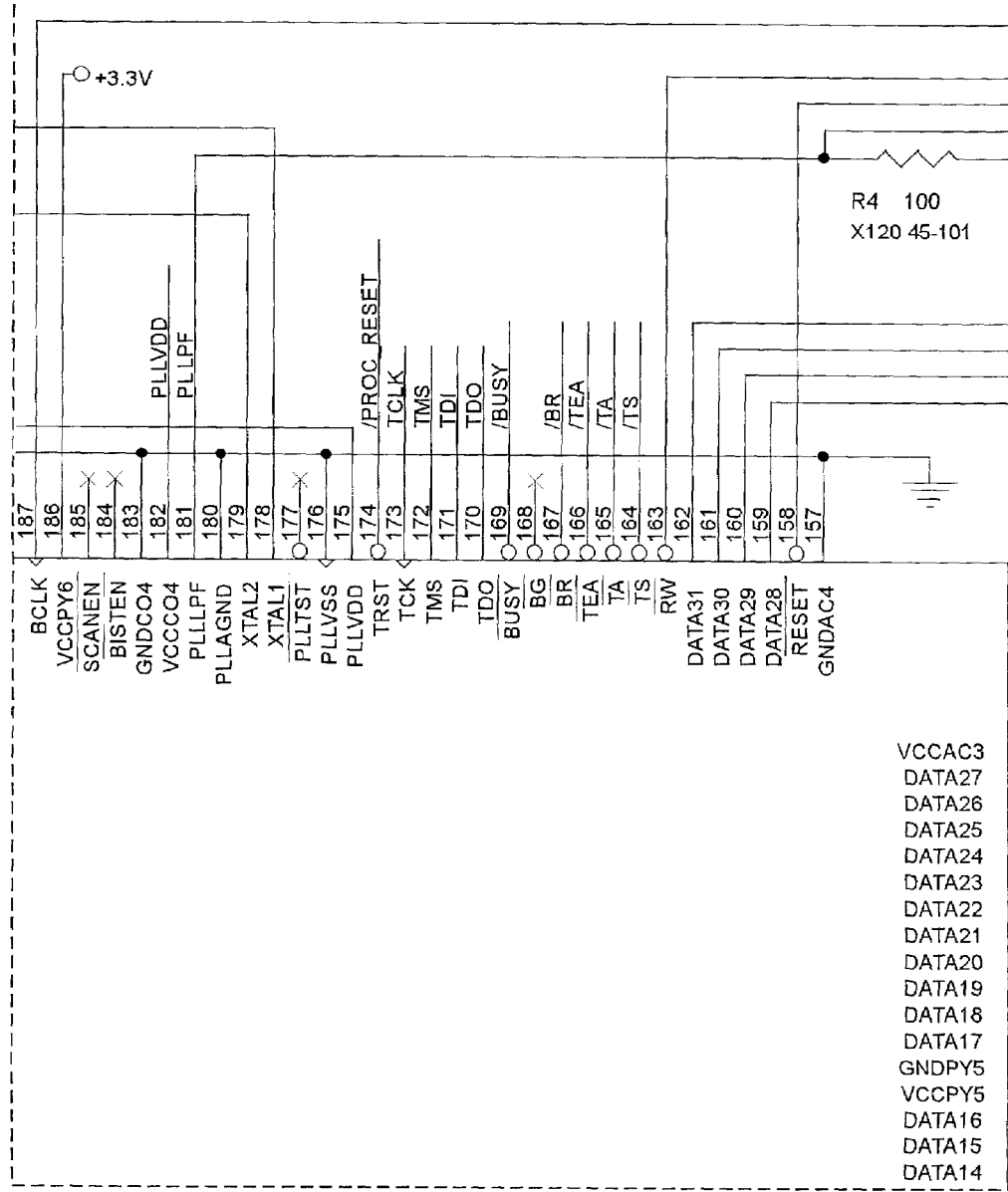
Figure 4D:
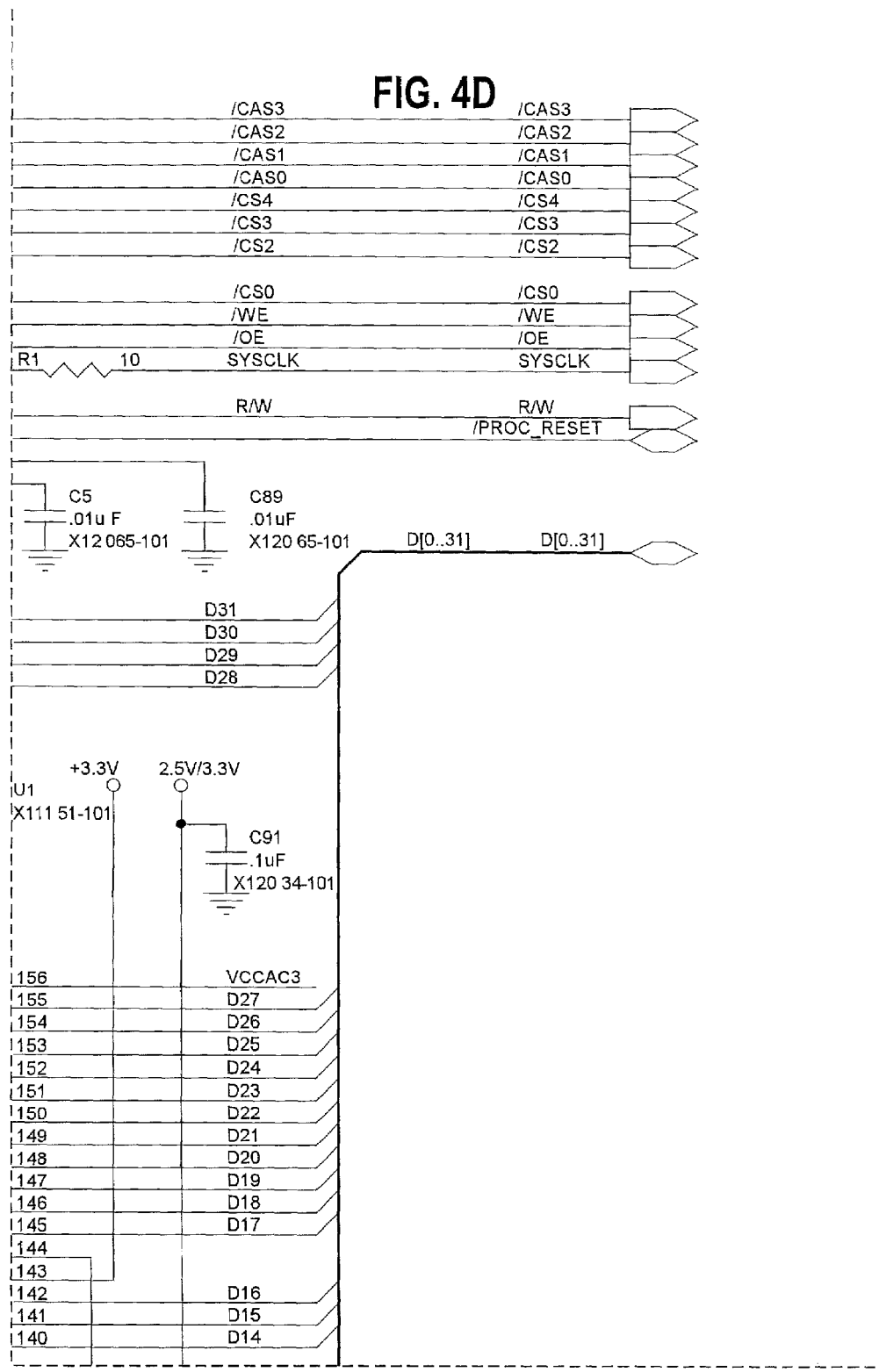
Figure 4E:
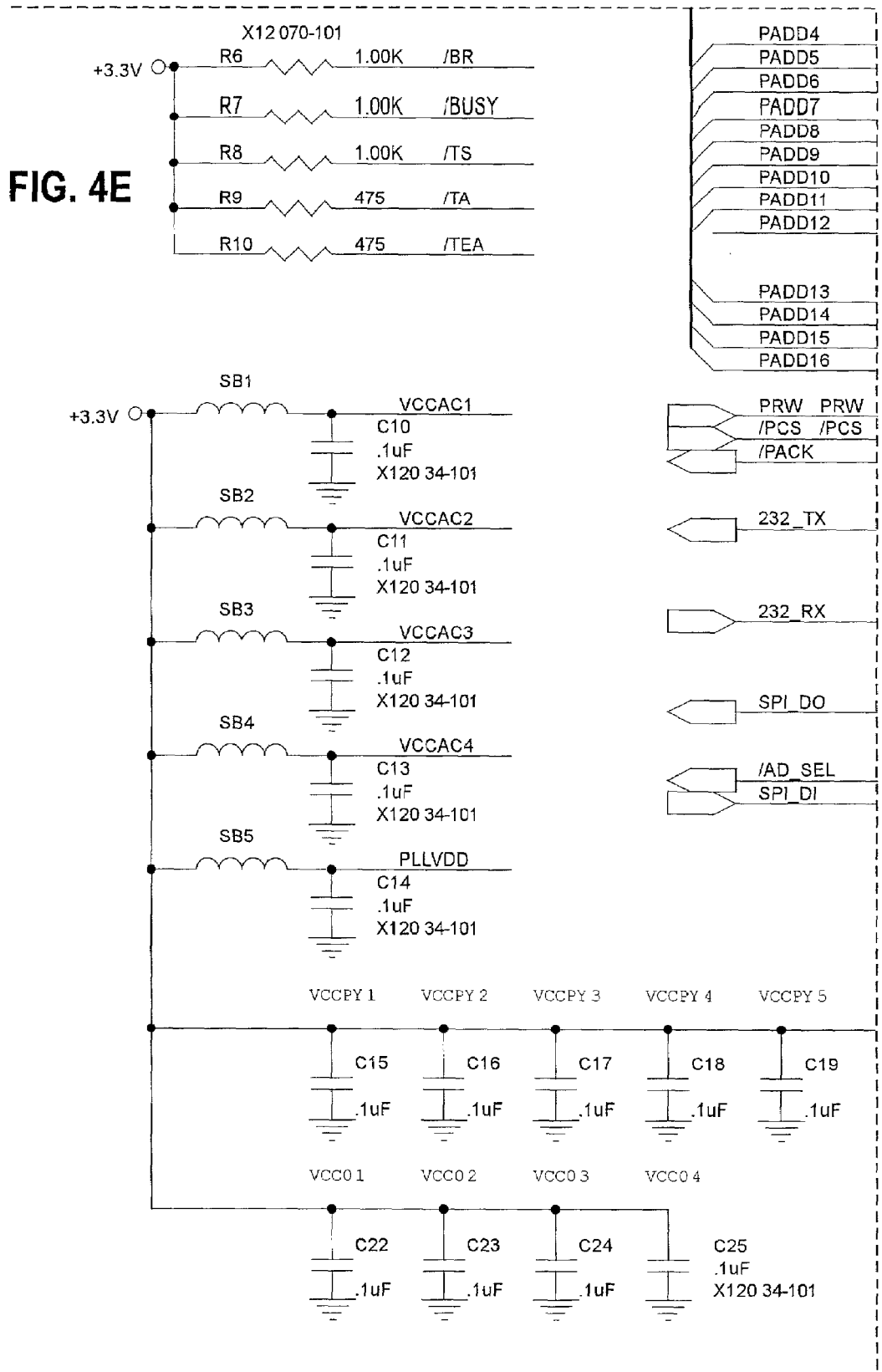
Figure 4F:
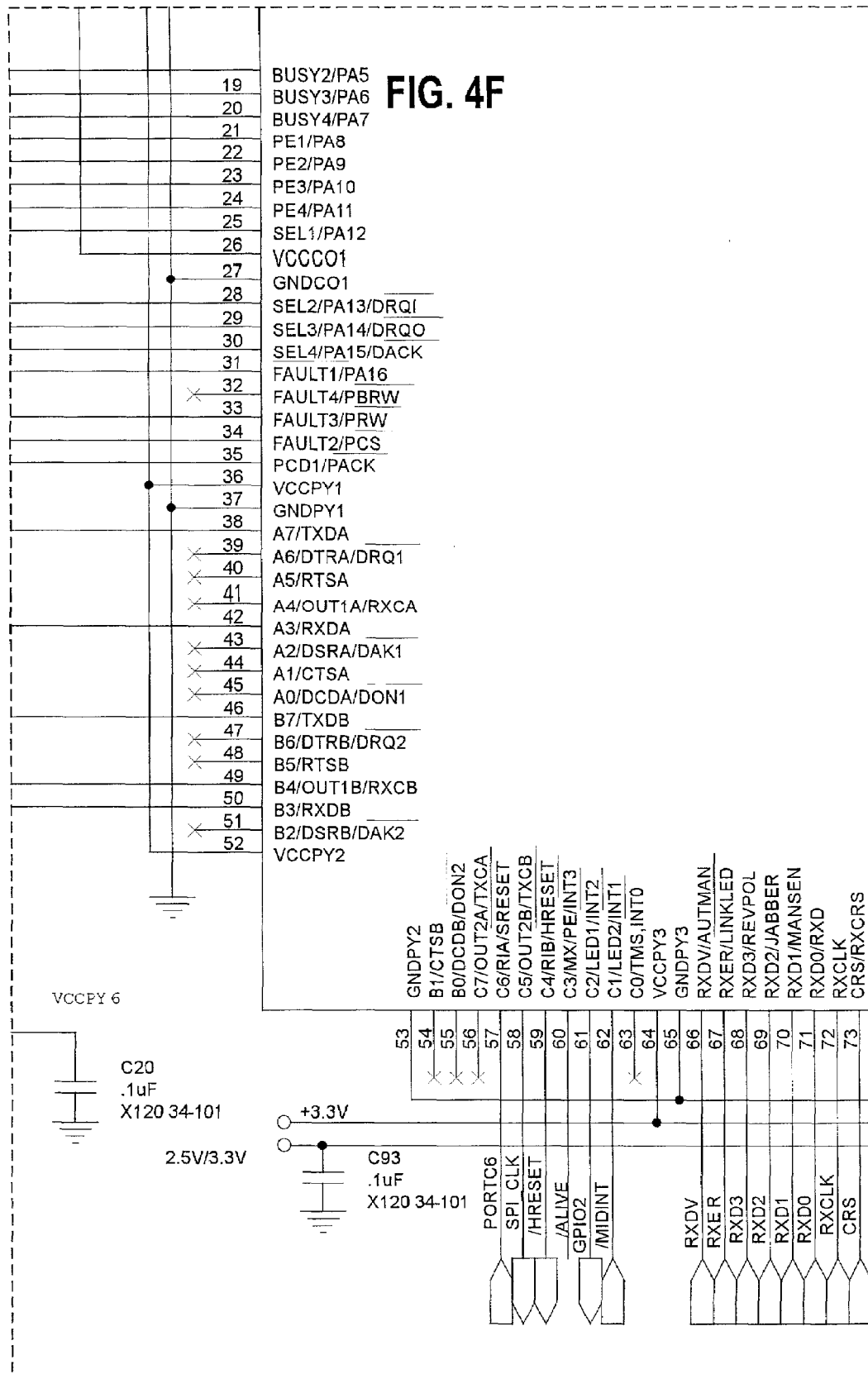
Figure 4H:
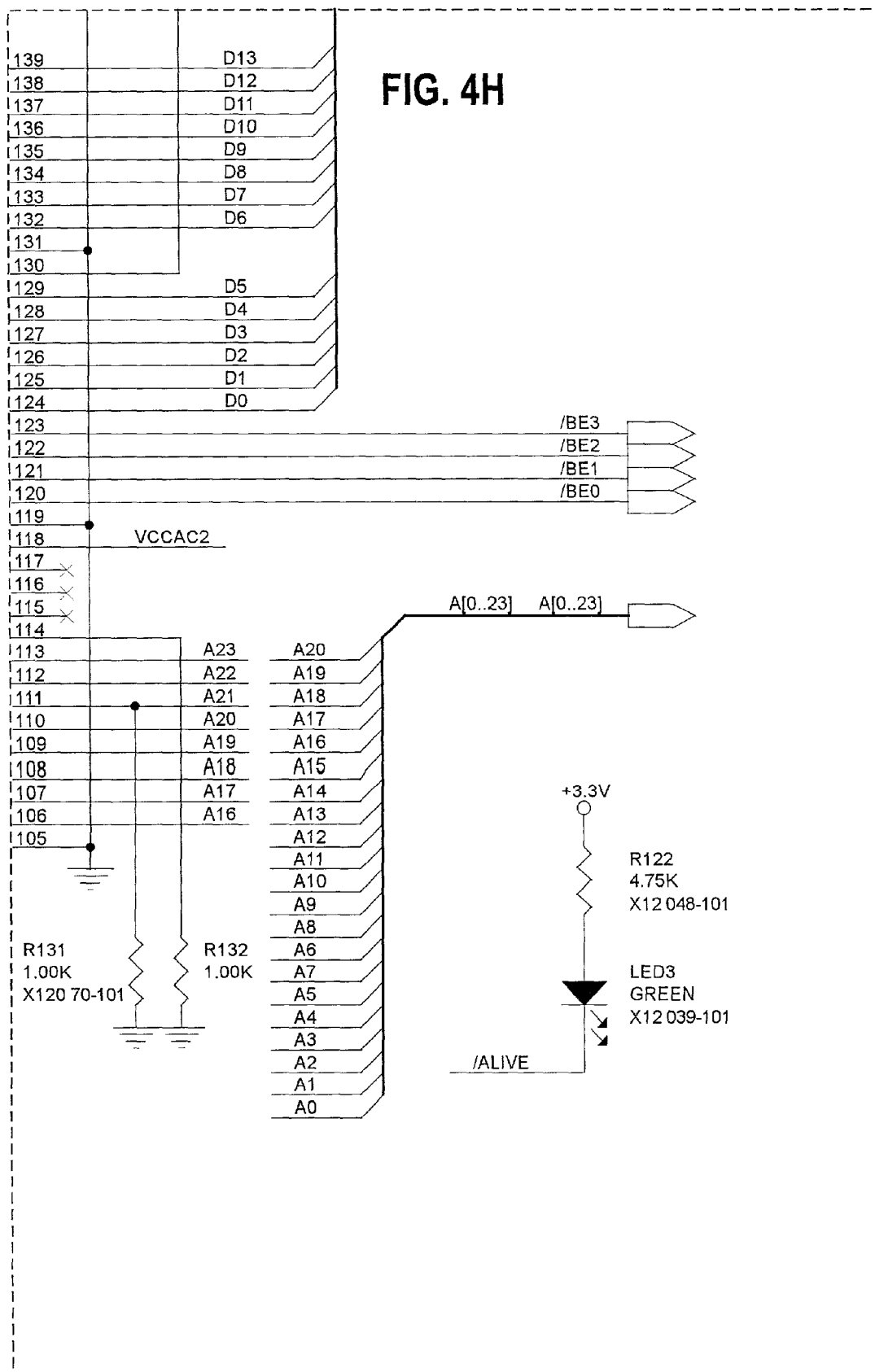
Figure 5B:
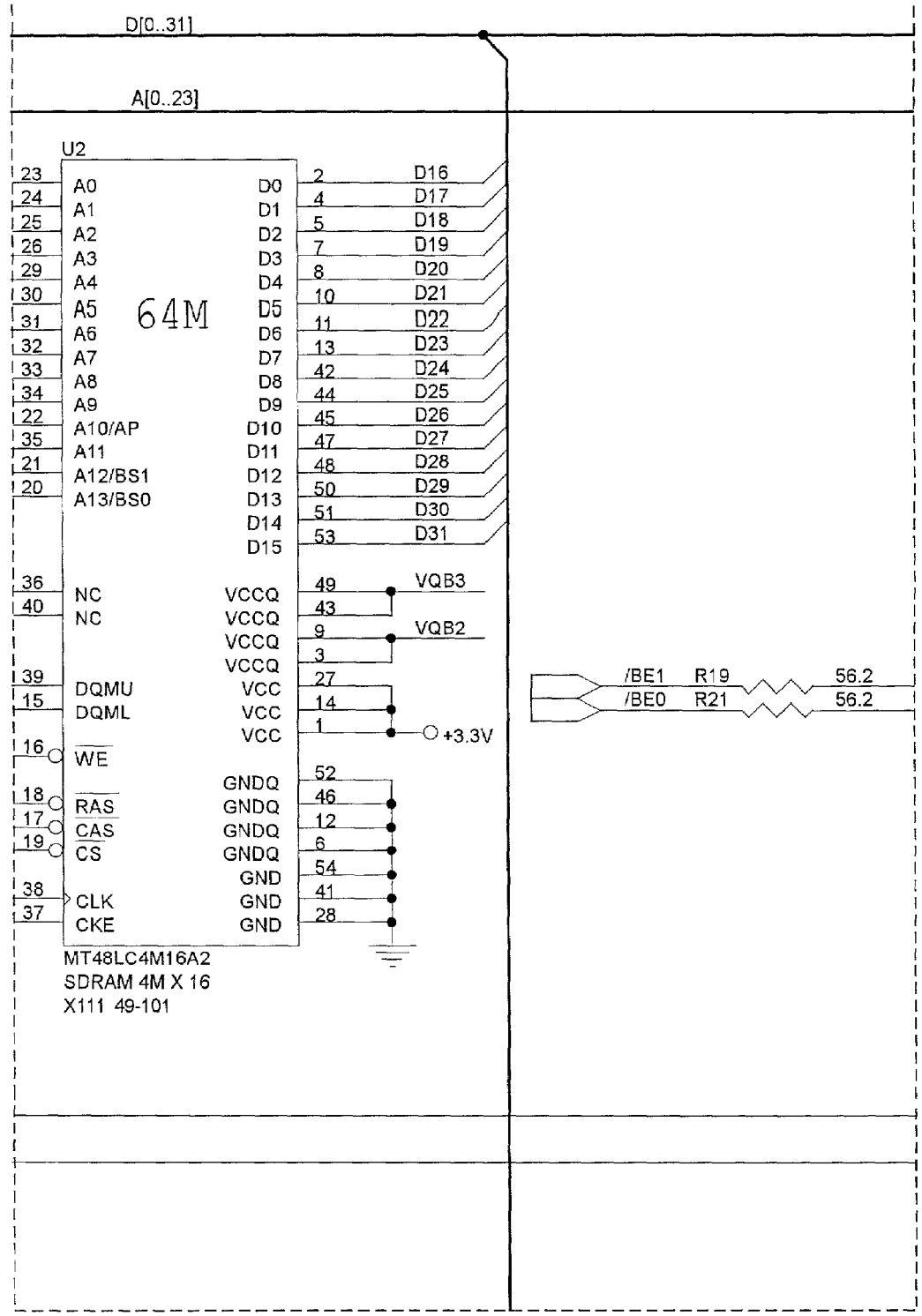
Figure 5C:
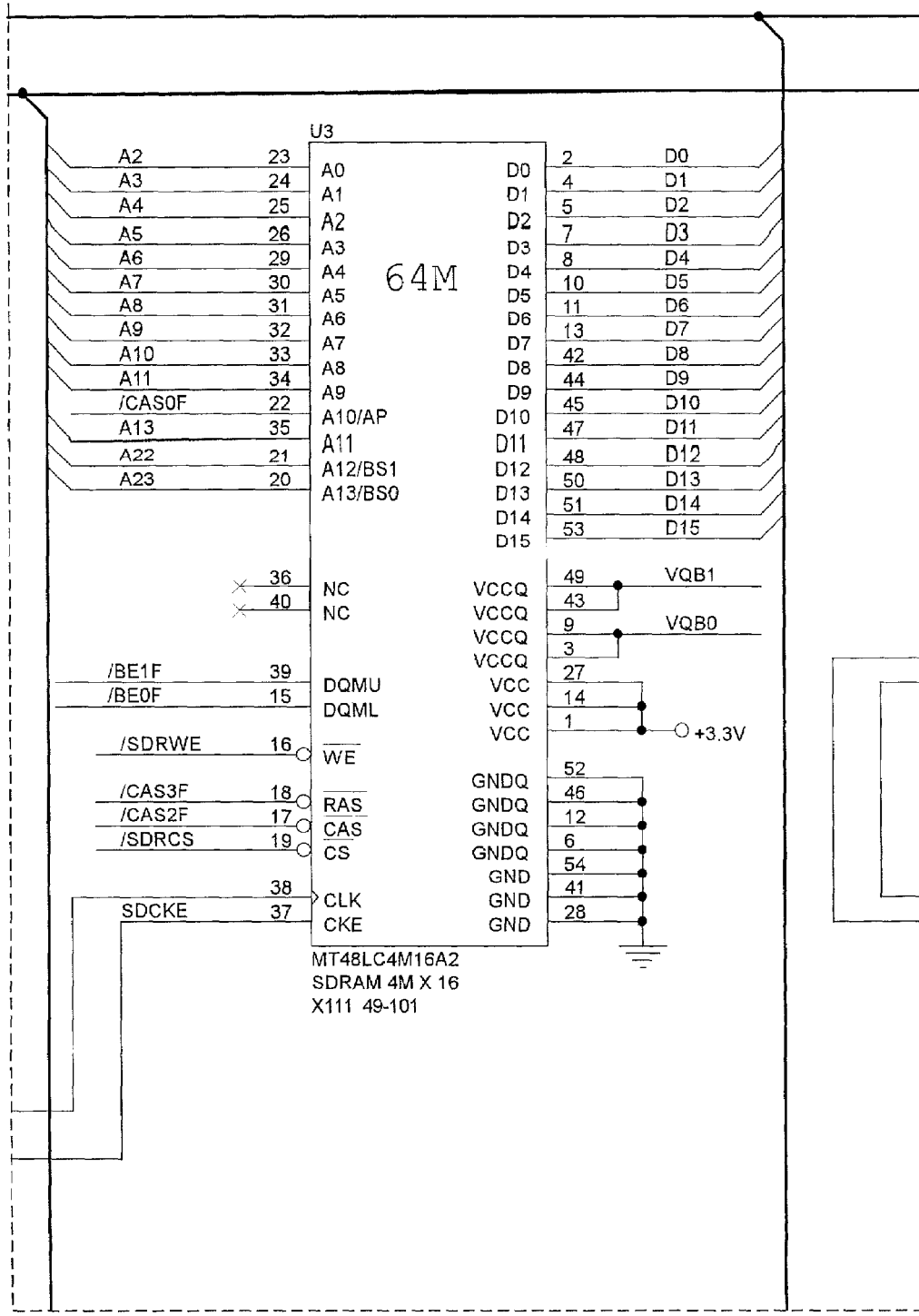
Figure 5D:
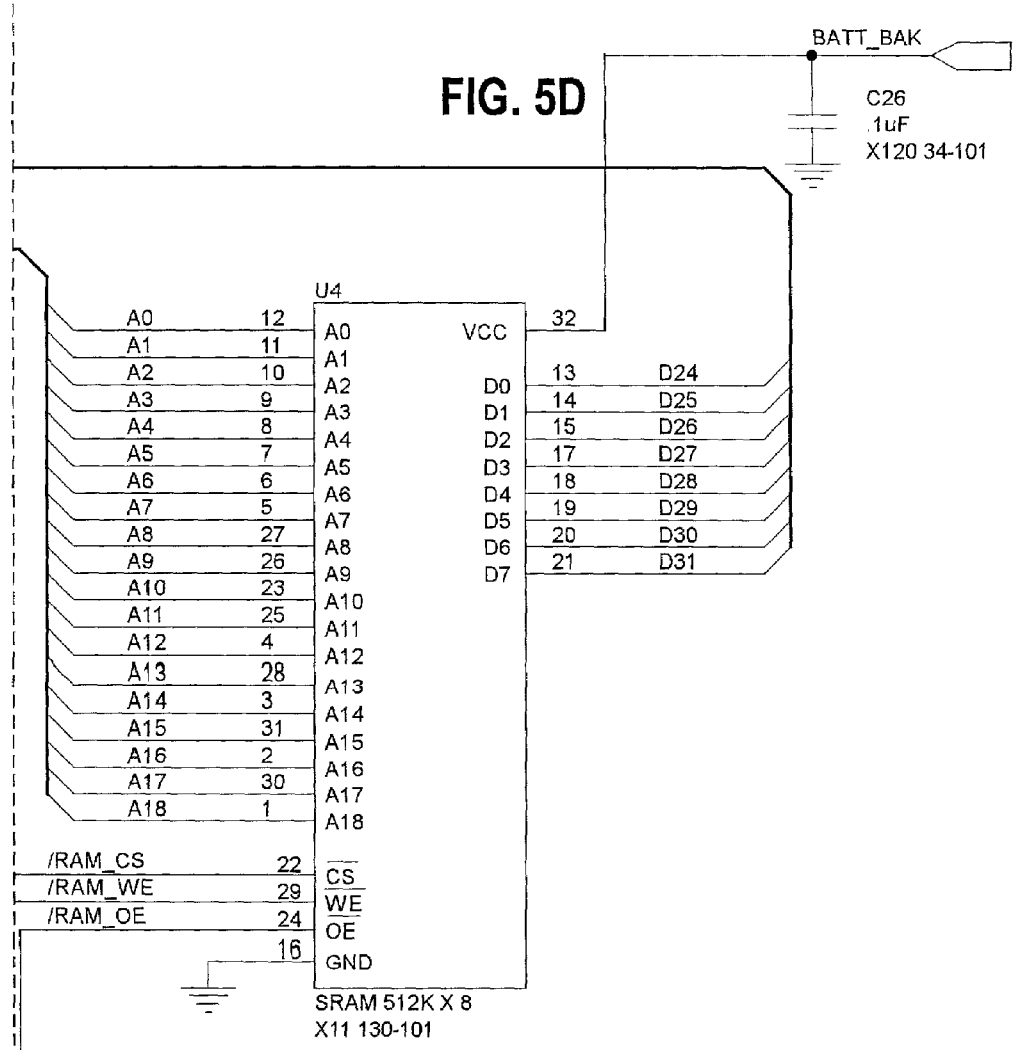
Figure 5E:
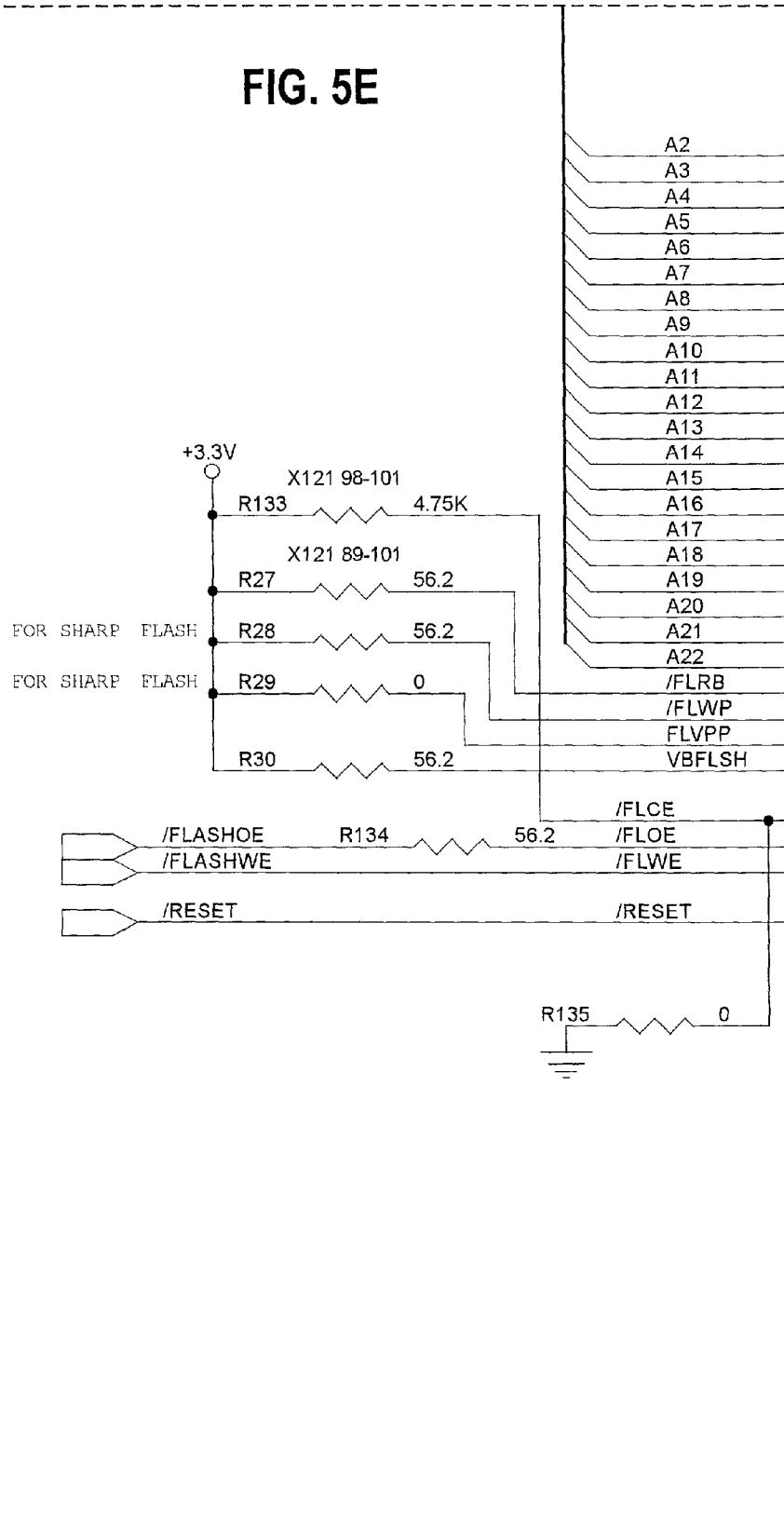
Figure 5F:
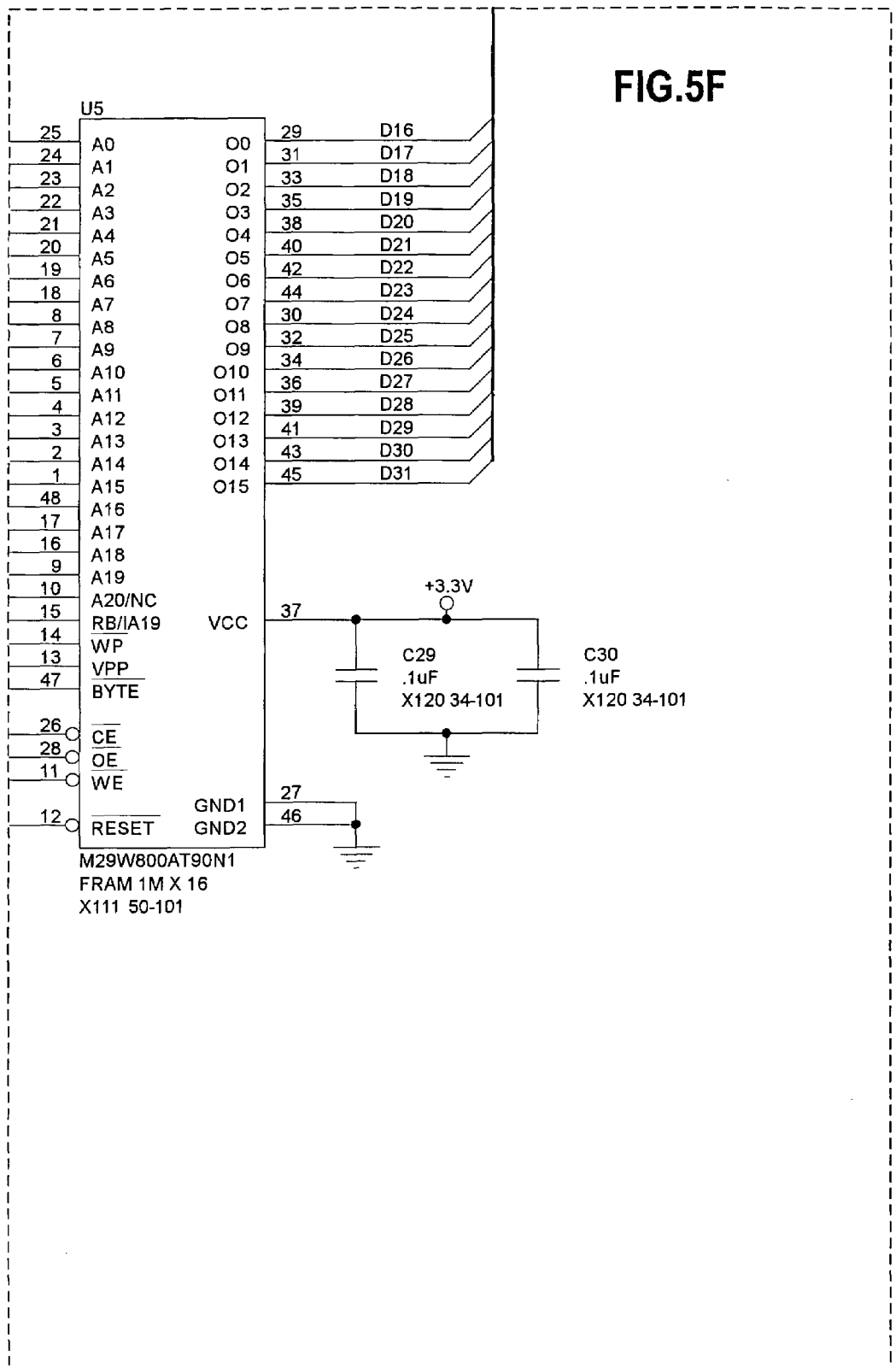
Figure 6B:
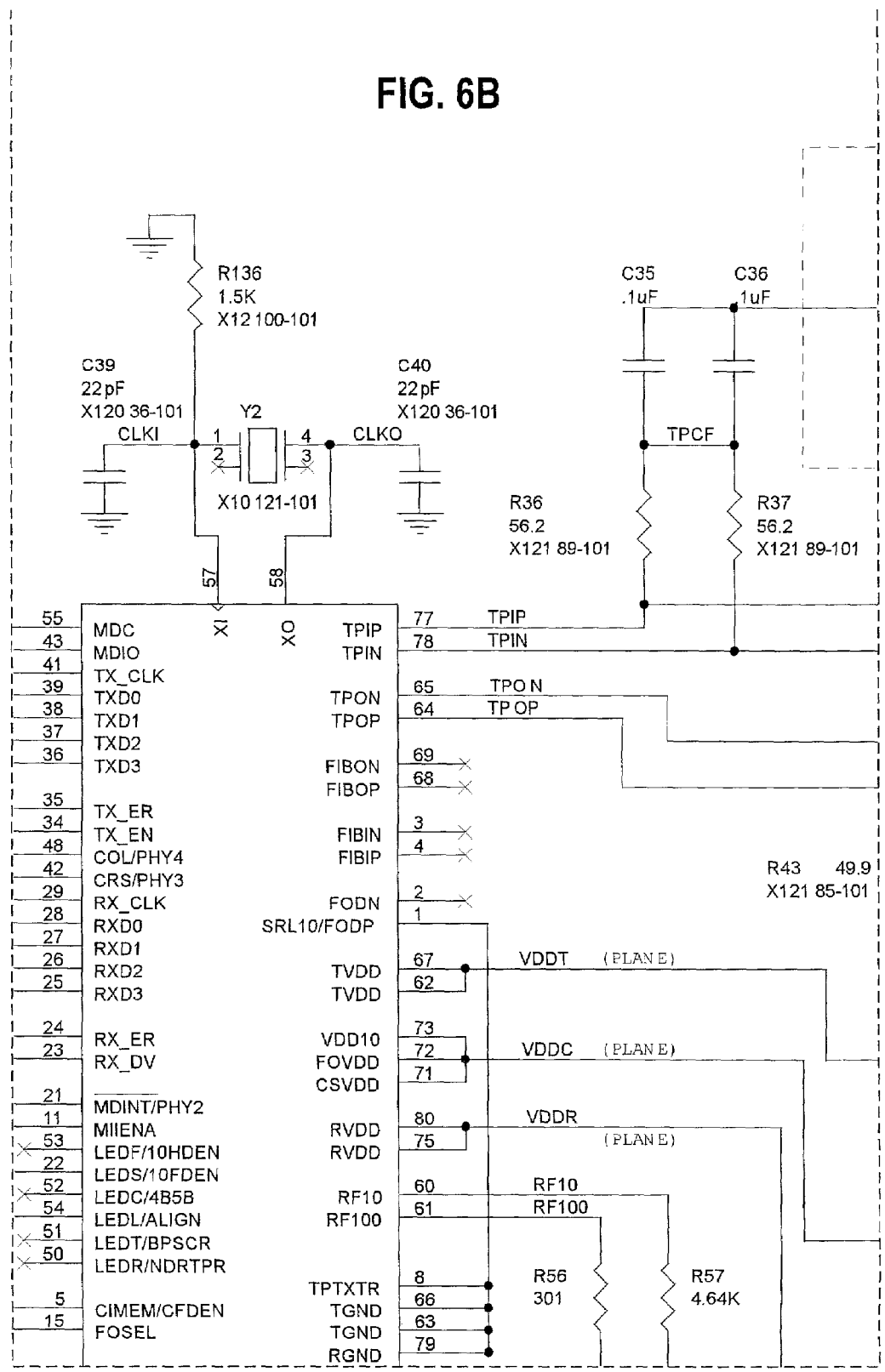
Figure 6C:
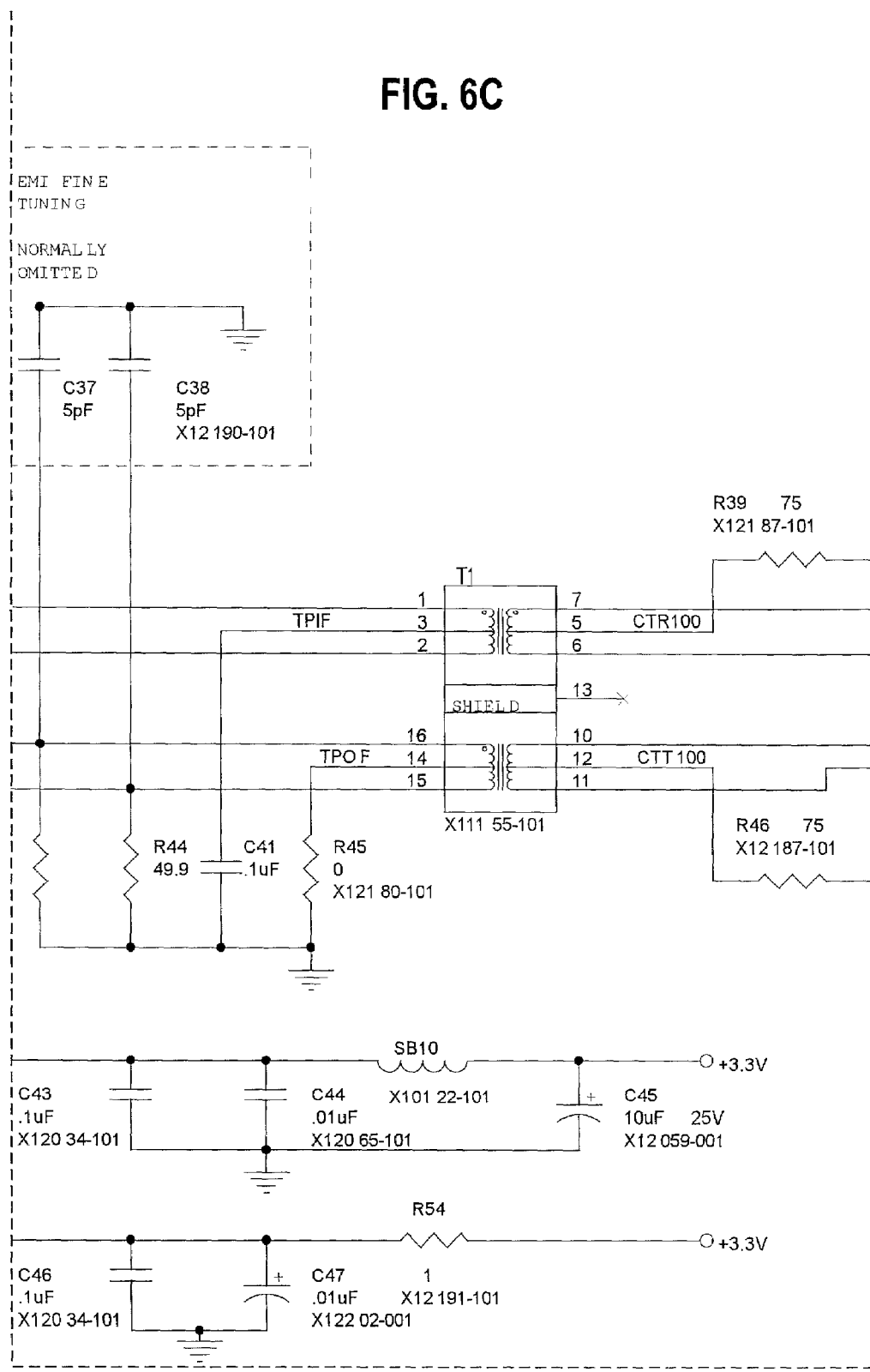
Figure 6D:
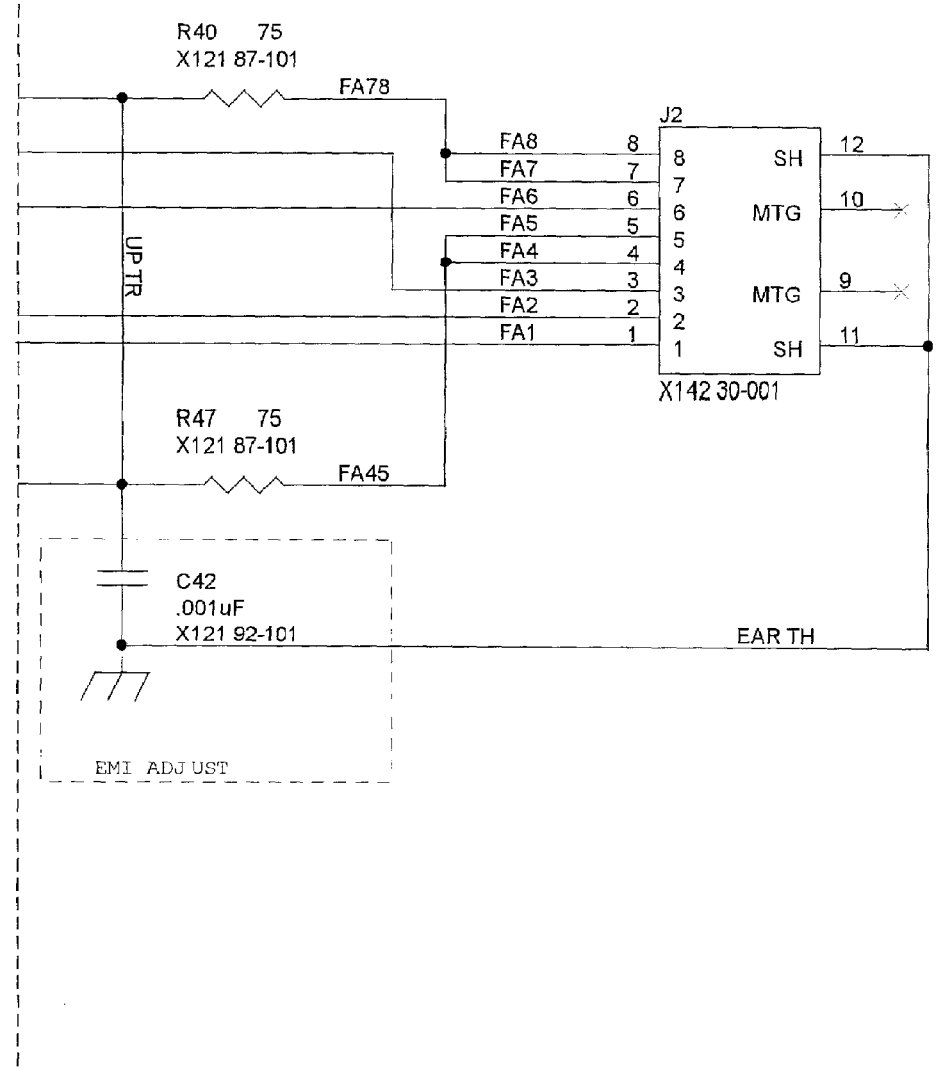
Figure 6F:
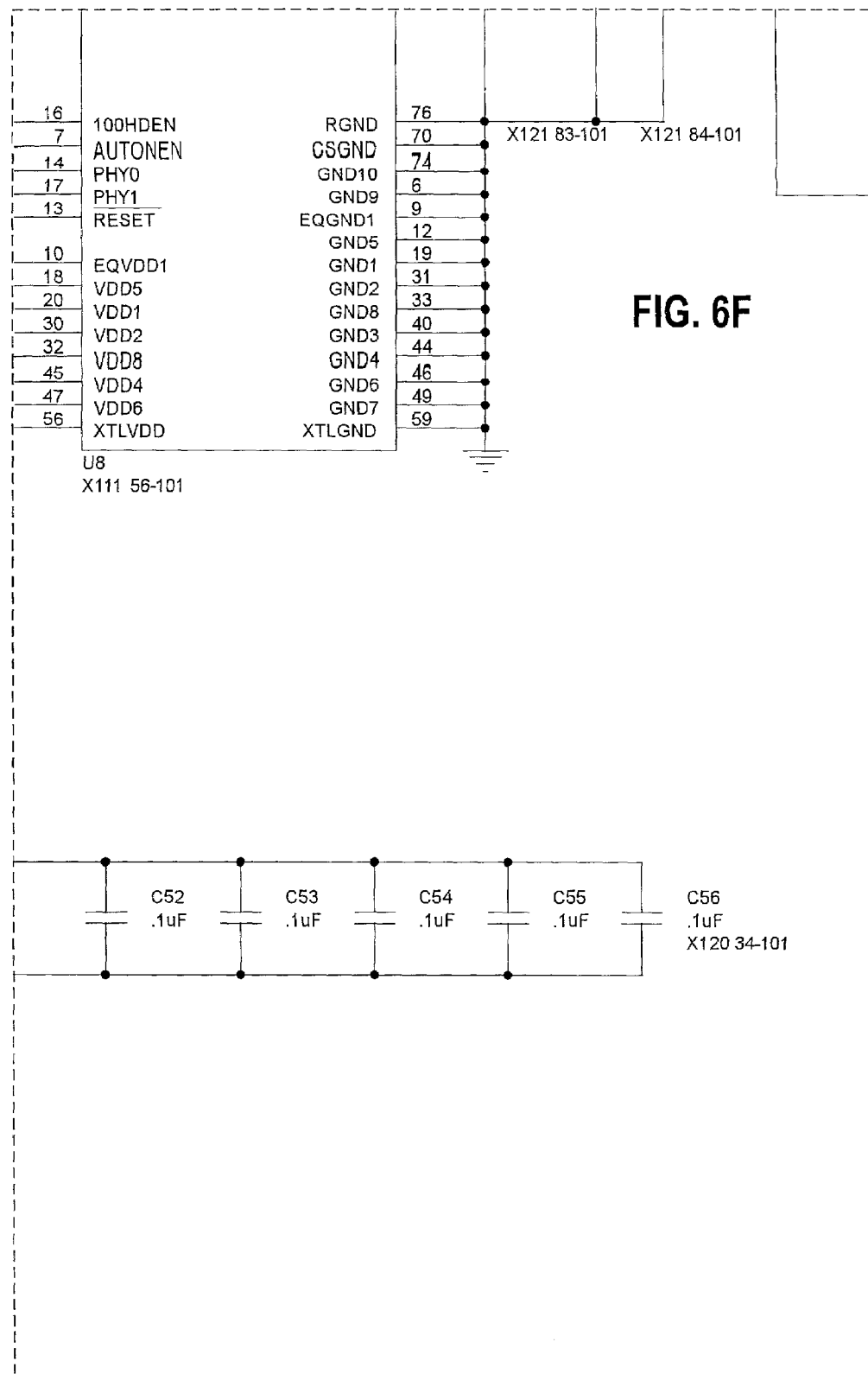
Figure 6G:
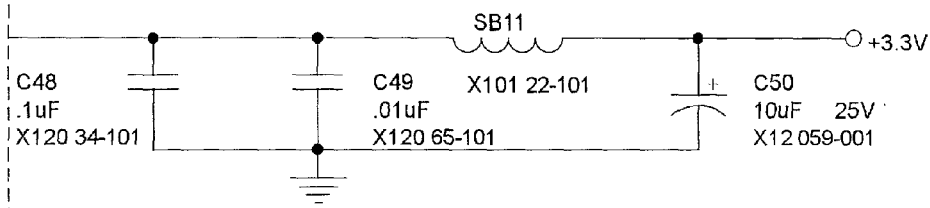
Figure 7C:
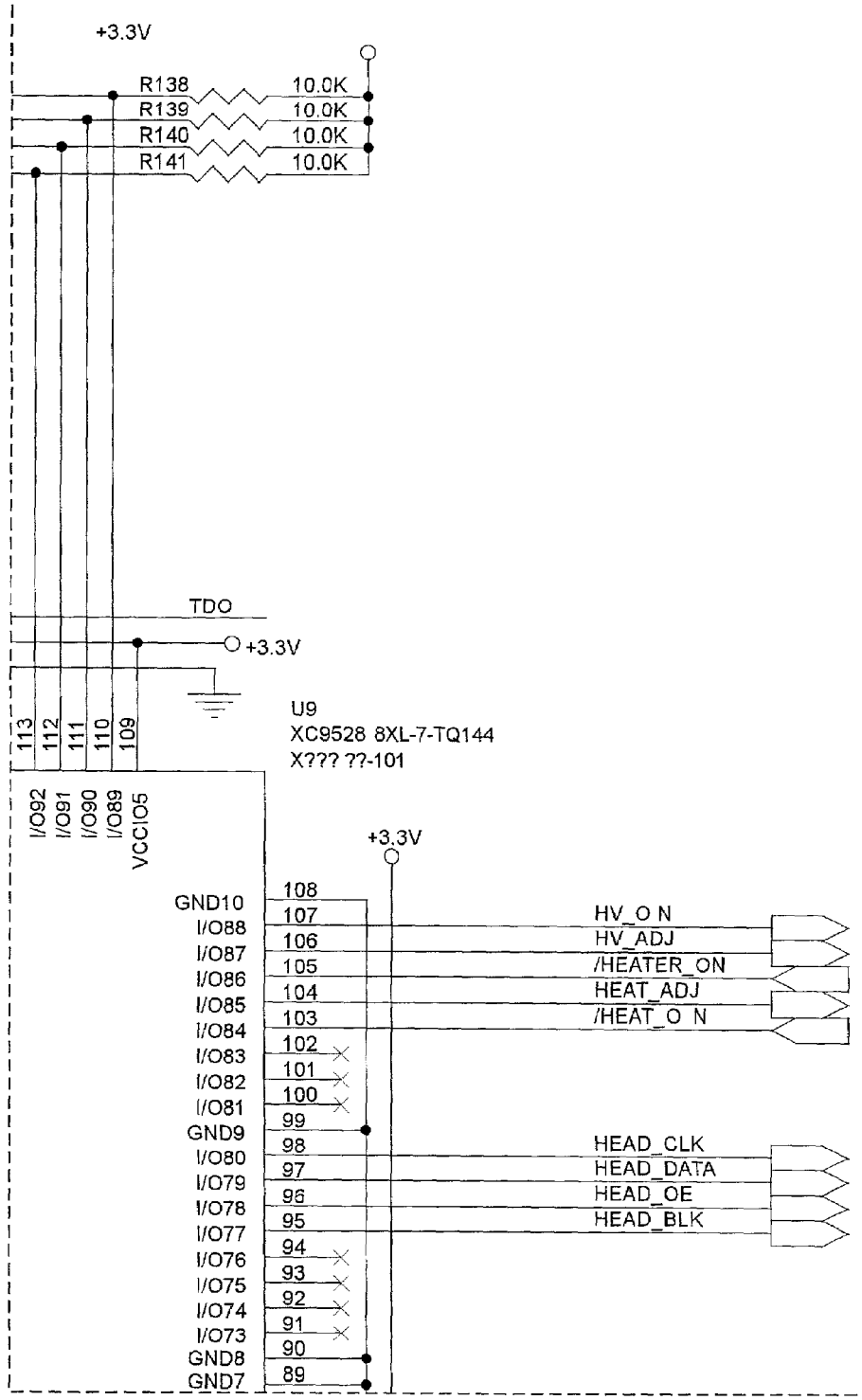
Figure 7D:
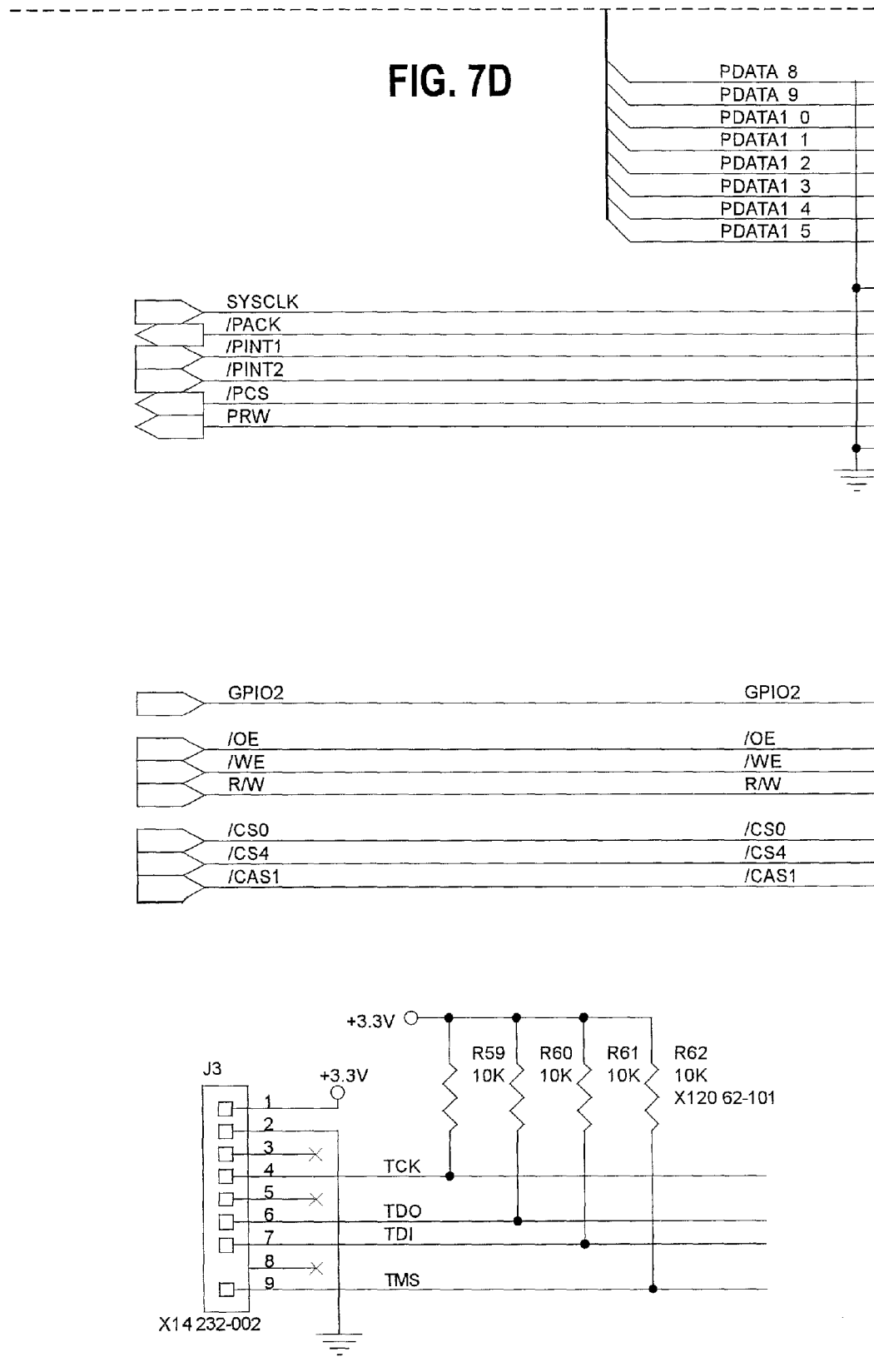
Figure 7E:
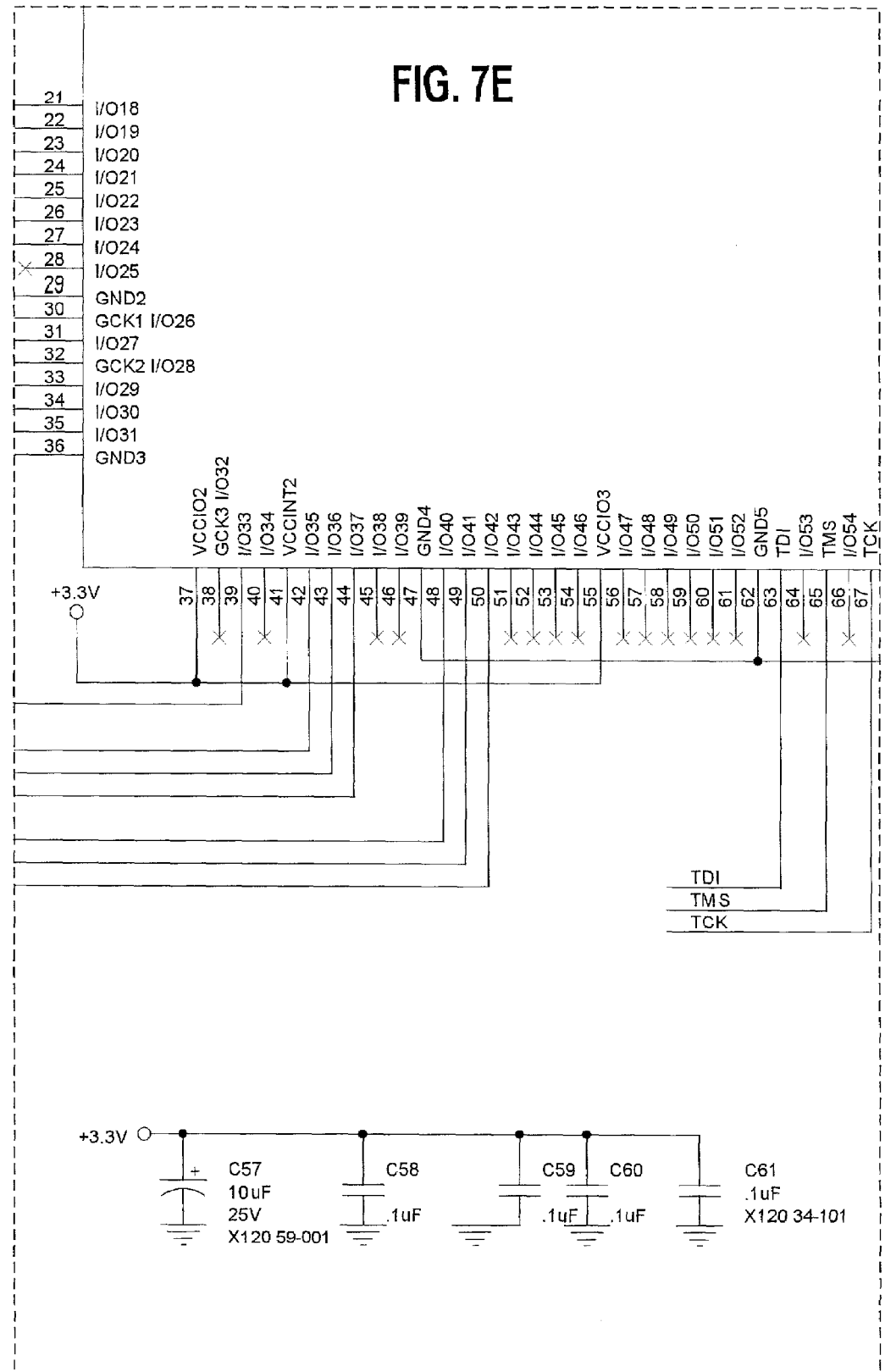
Figure 7F:
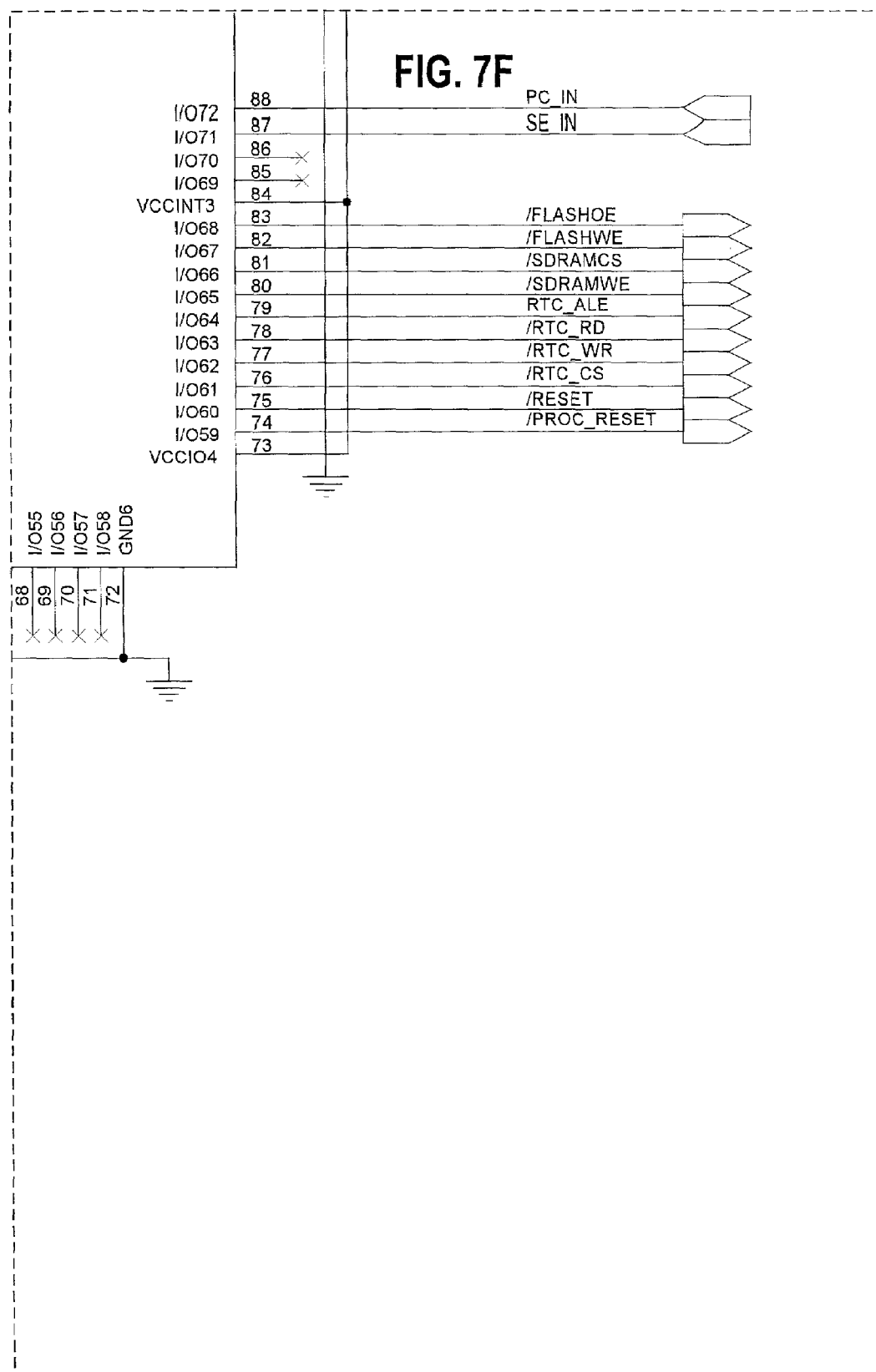

Referring now to FIGS. 3–10, circuit diagrams showing various components of a particularly preferred embodiment of the invention are provided. The circuit diagram for microprocessor 16 is shown in FIG. 3, and uses Ethernet support supplied by NetSilicon. FIG. 4 illustrates the memory (ROM and RAM) of the processor used to store the instructions required by the processor so it may perform the functions necessary to print images with a piezoelectric printhead.

FIG. 5 shows circuitry enabling physical connection to the Internet. The physical connection is only part of the Internet communication solution. Software, which may be provided by NetSilicon, is also used to manage the Internet link. This software is combined with the software used to print messages with piezoelectric printheads. The circuitry shown in FIG. 5, together with that shown in FIG. 3, provides the Internet connection.

FIG. 6 discloses a programmable device that provides hardware necessary to support piezoelectric printheads. The formatting of data received from the Internet into raster data required by the printhead is performed in this device.

Figure 8:
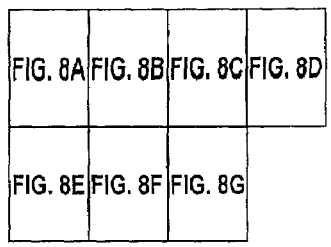
Figure 8A:
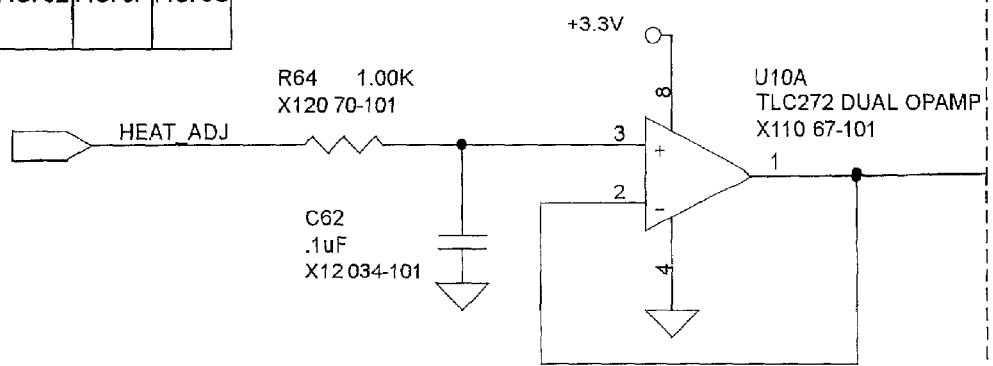
Figure 8B:
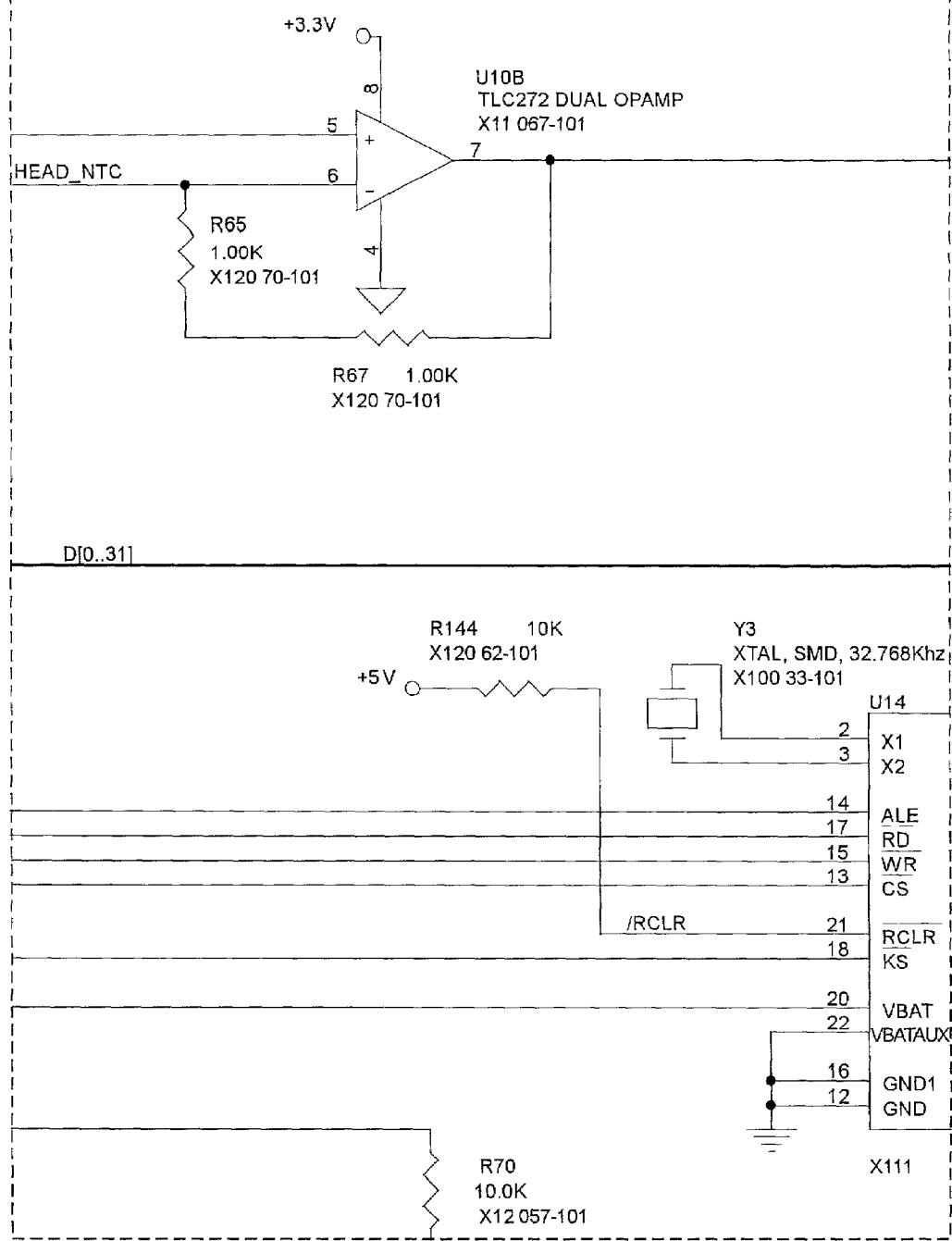
Figure 8D:
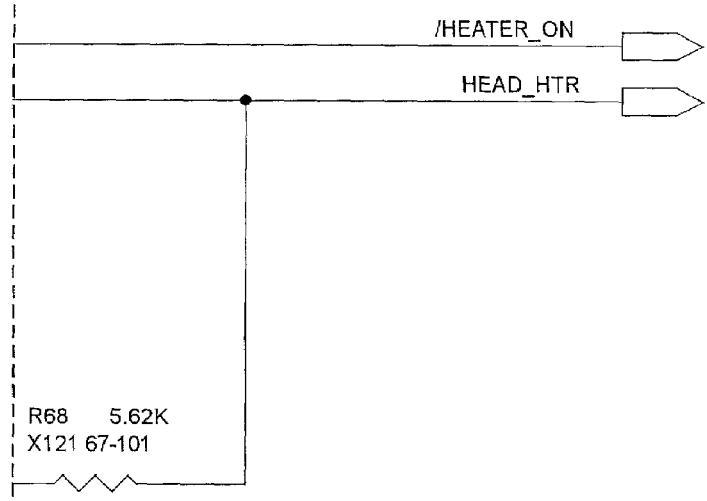
Figure 8G:
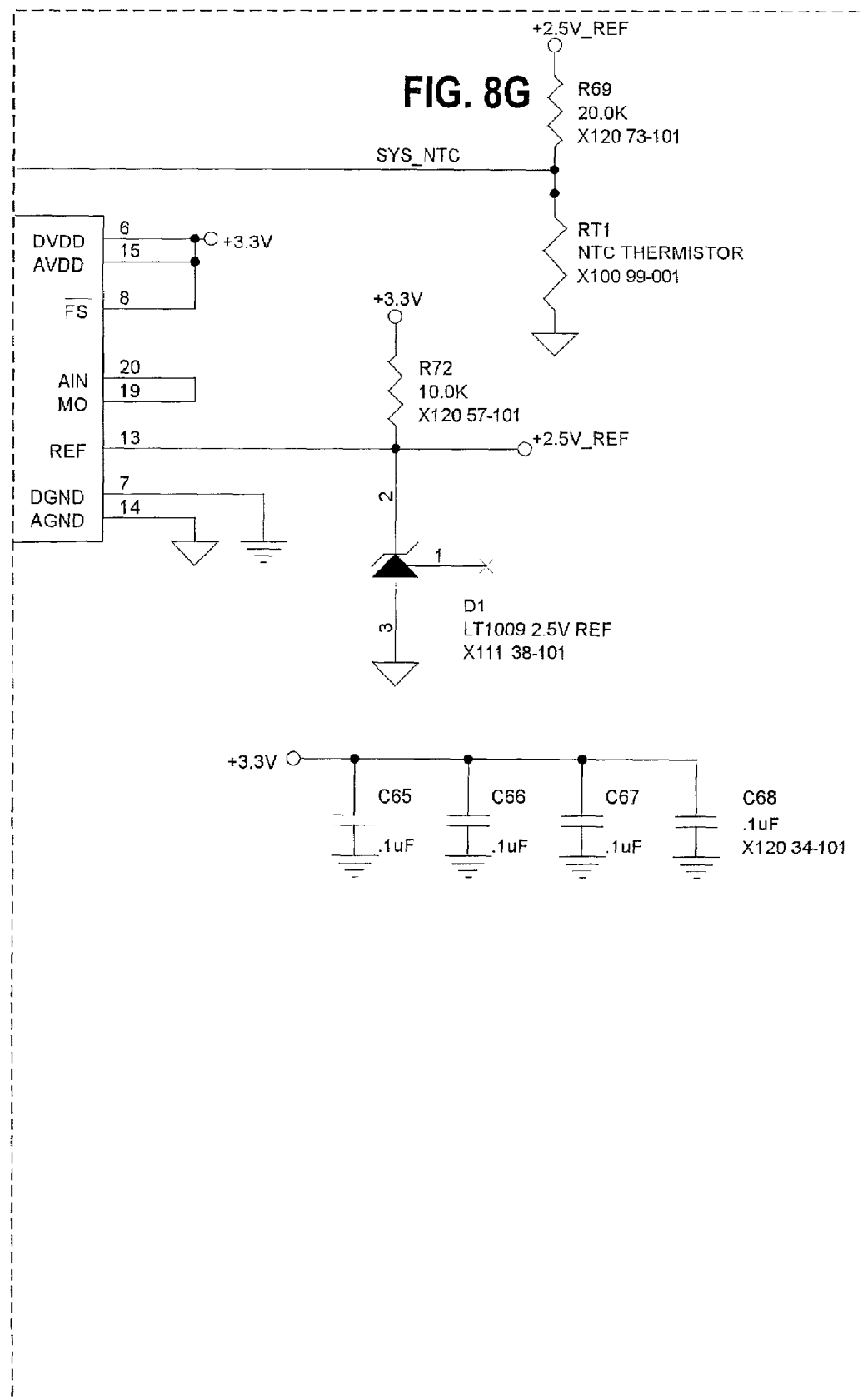

FIG. 7 discloses circuitry for supporting the requirements of the printhead. This circuitry enables the printhead temperature to be controlled, and also extracts data from the printhead to set operating temperatures and operating voltages, as well known in the industry. FIG. 8 discloses circuitry for enabling printing using a piezoelectric printhead, as also well known in the industry.

Figures 9, 9A:
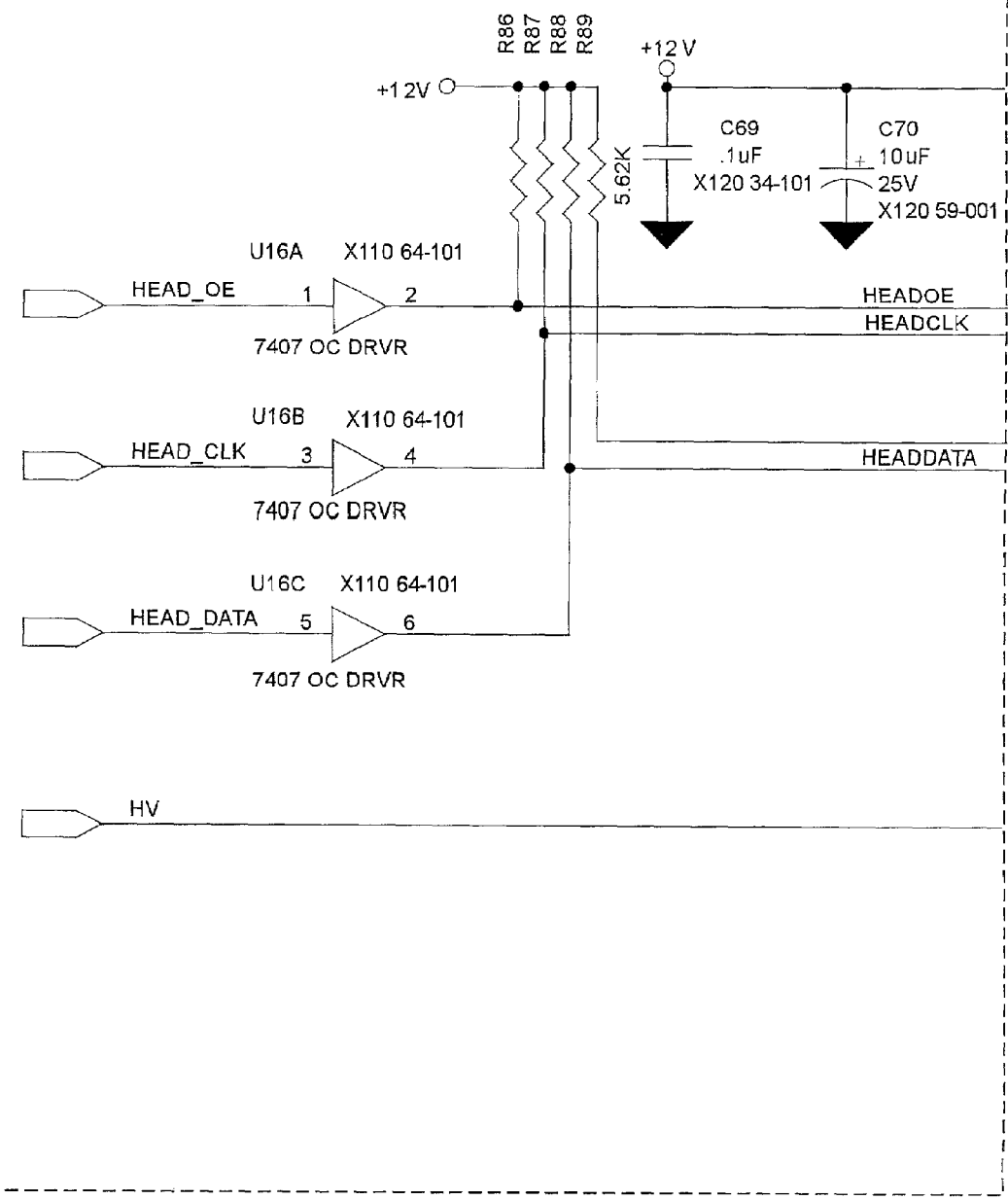
Figure 9B:
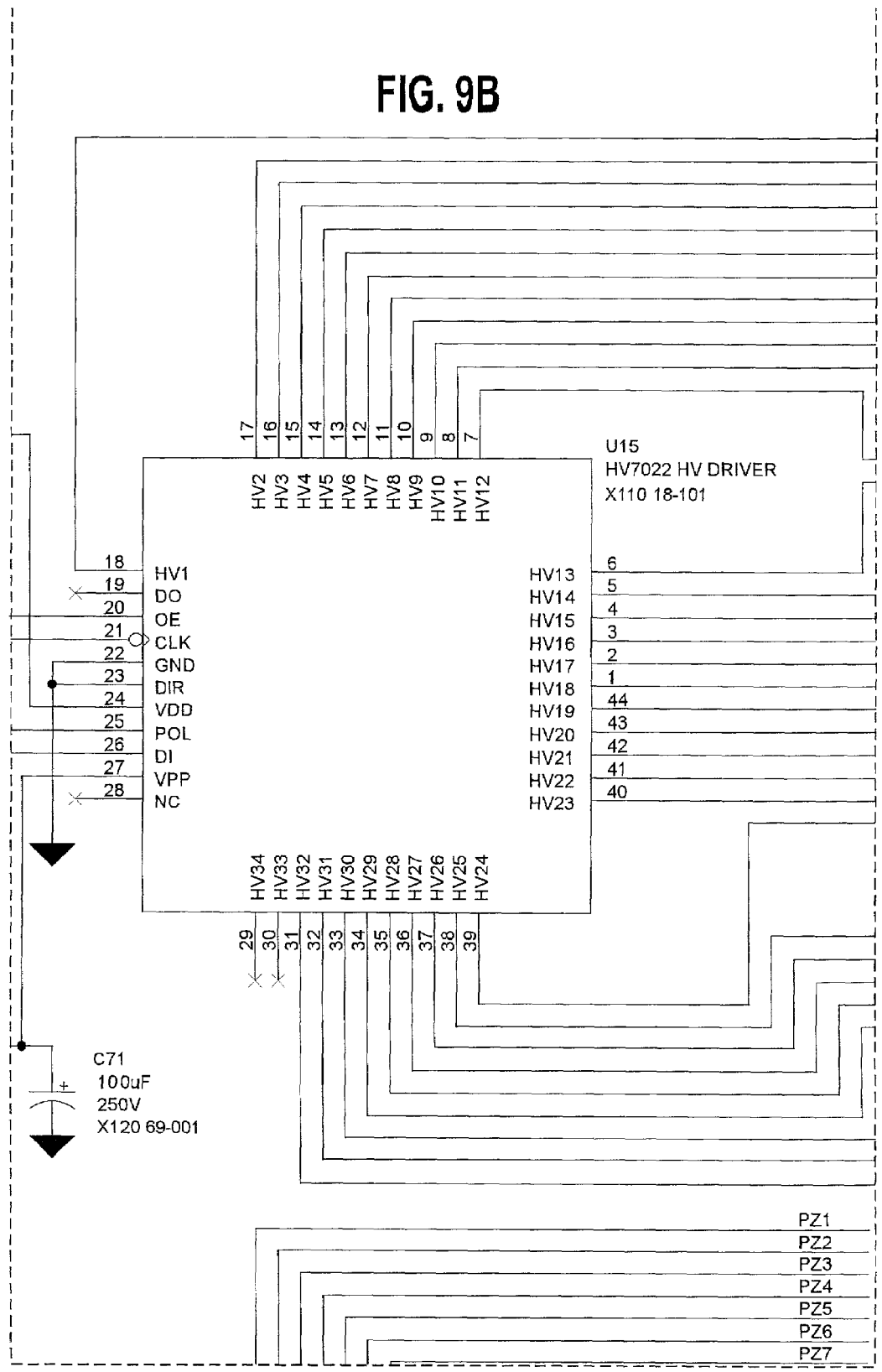
Figure 9C:
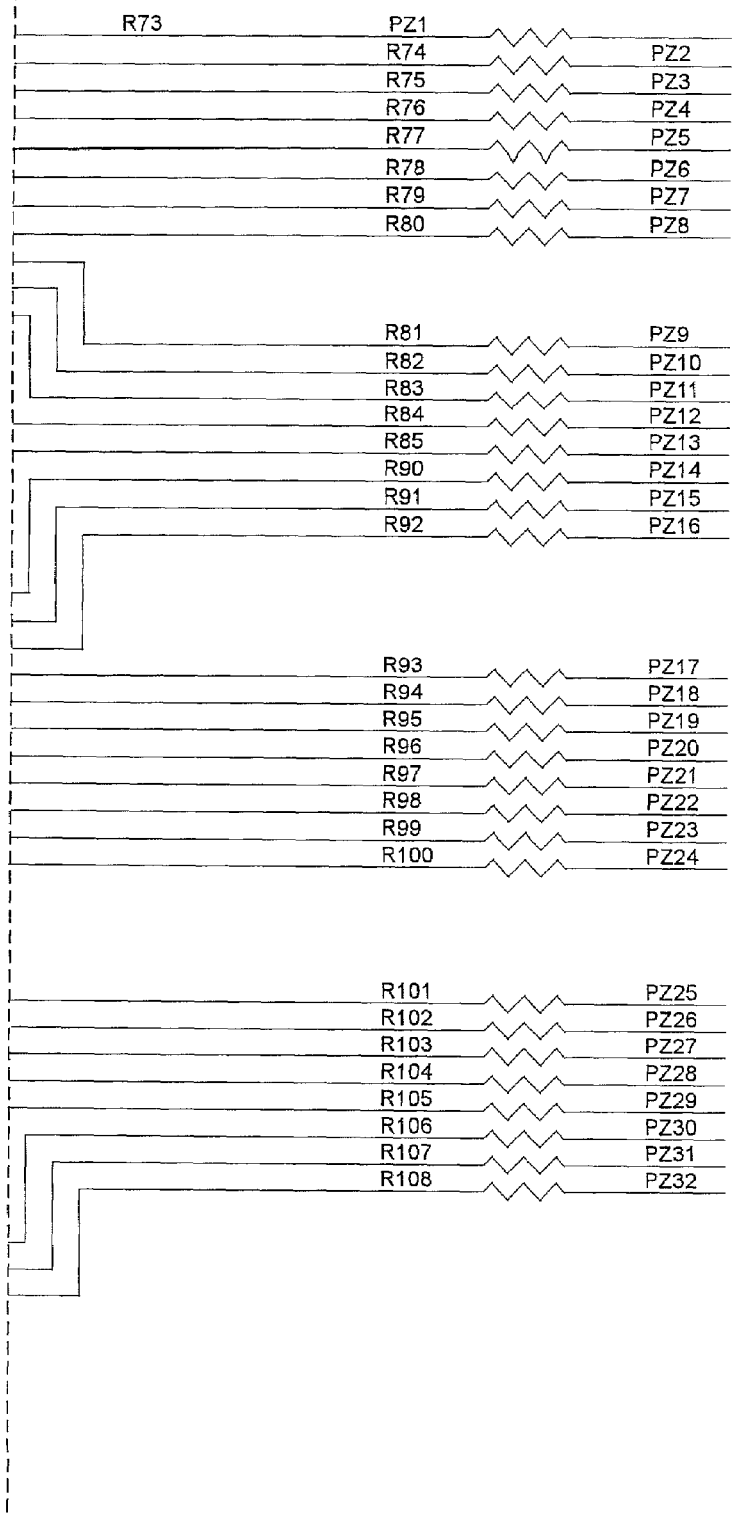
Figure 9D:
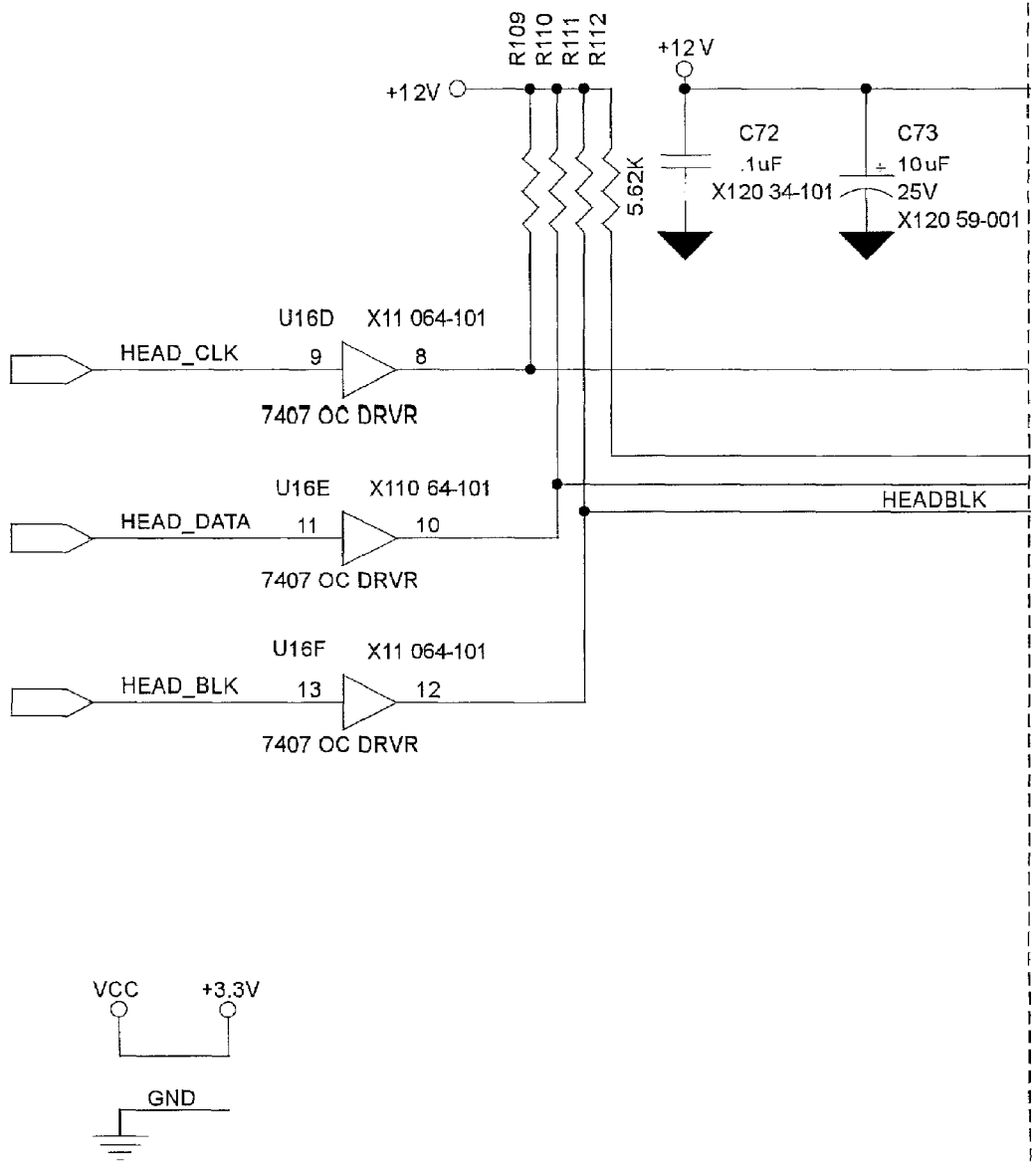
Figure 9F:
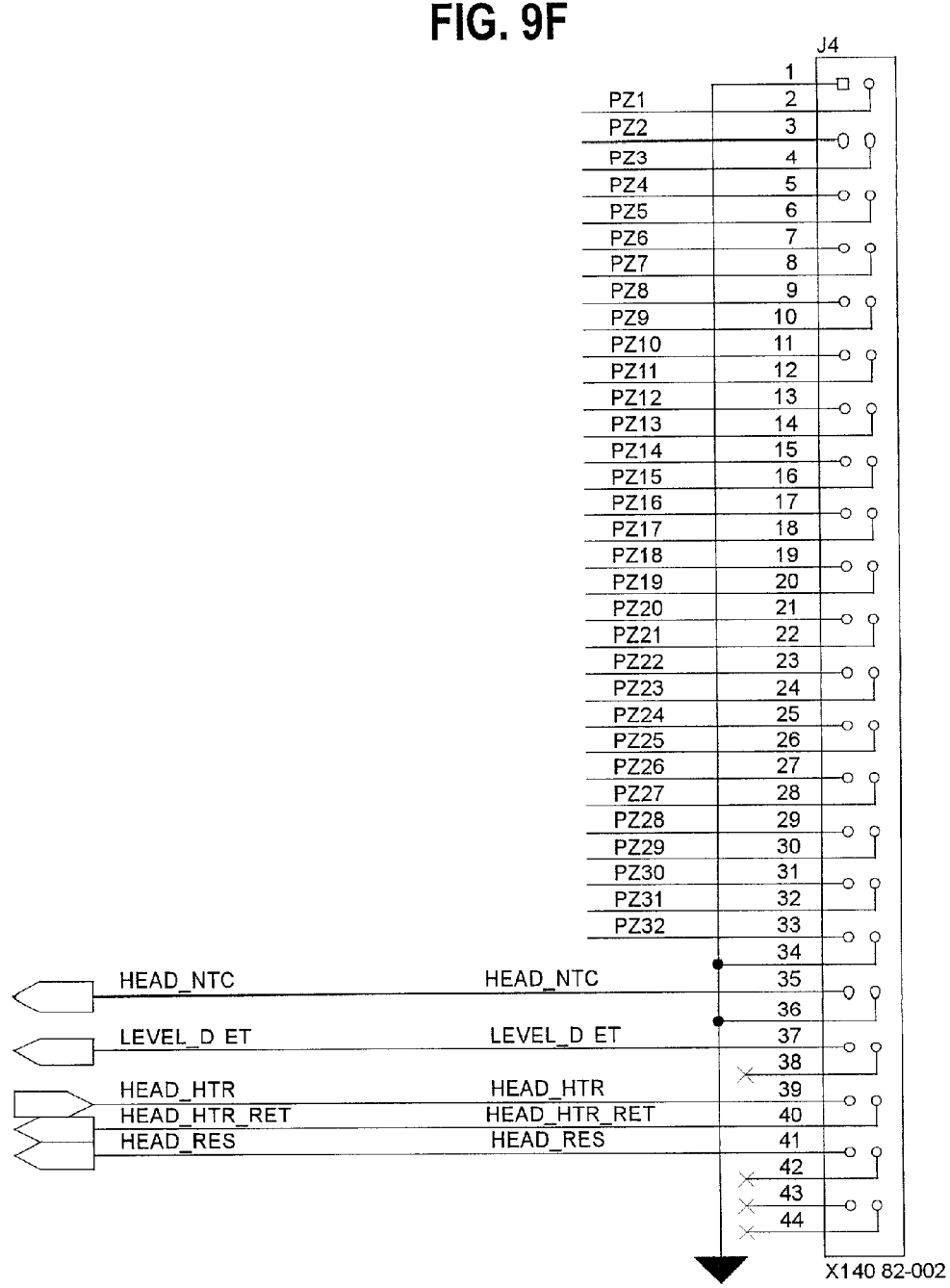
Figure 10:
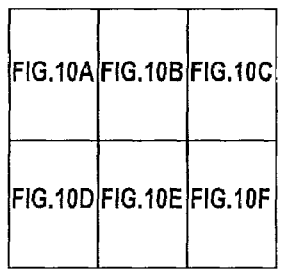
Figure 10A:
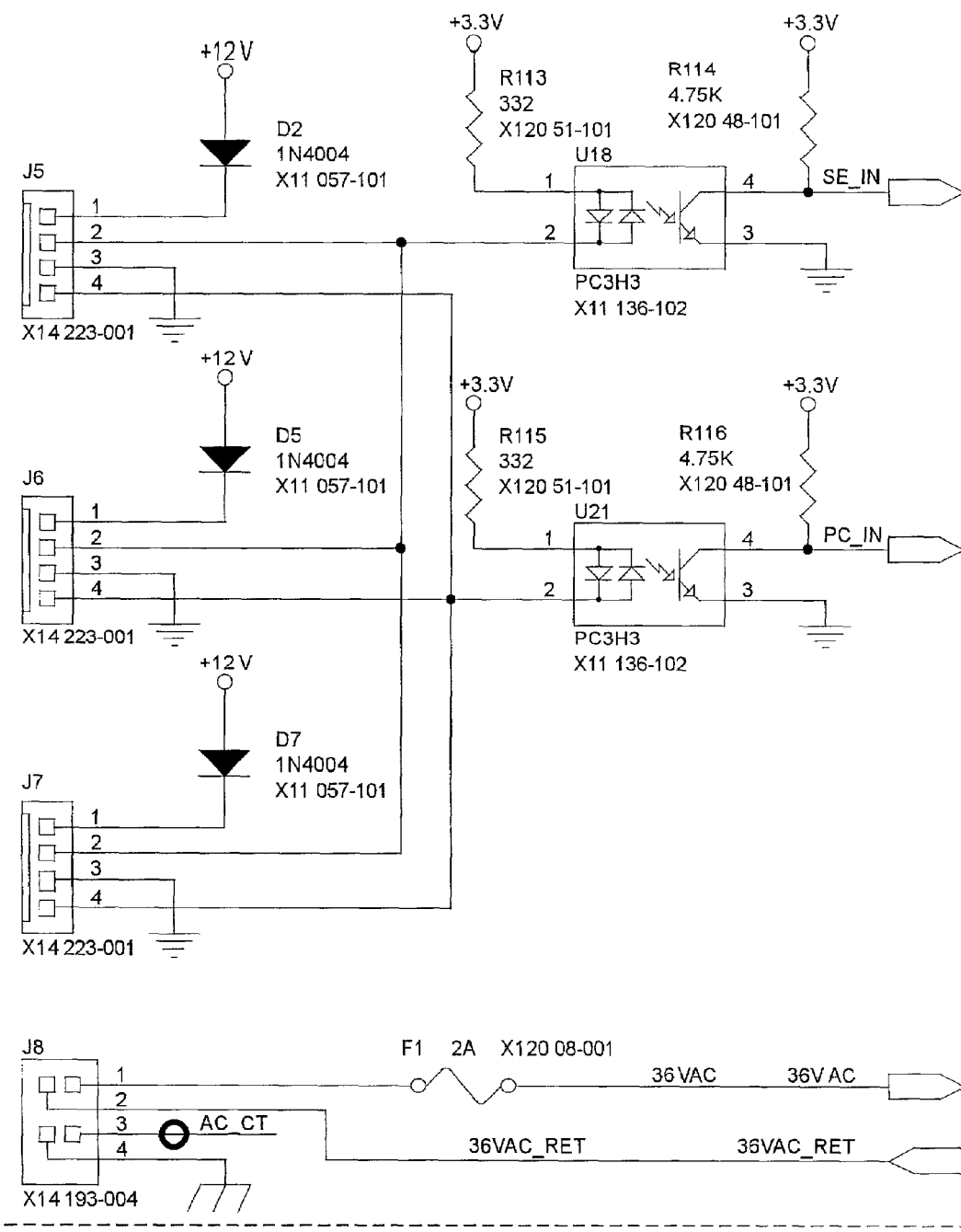
Figure 10B:
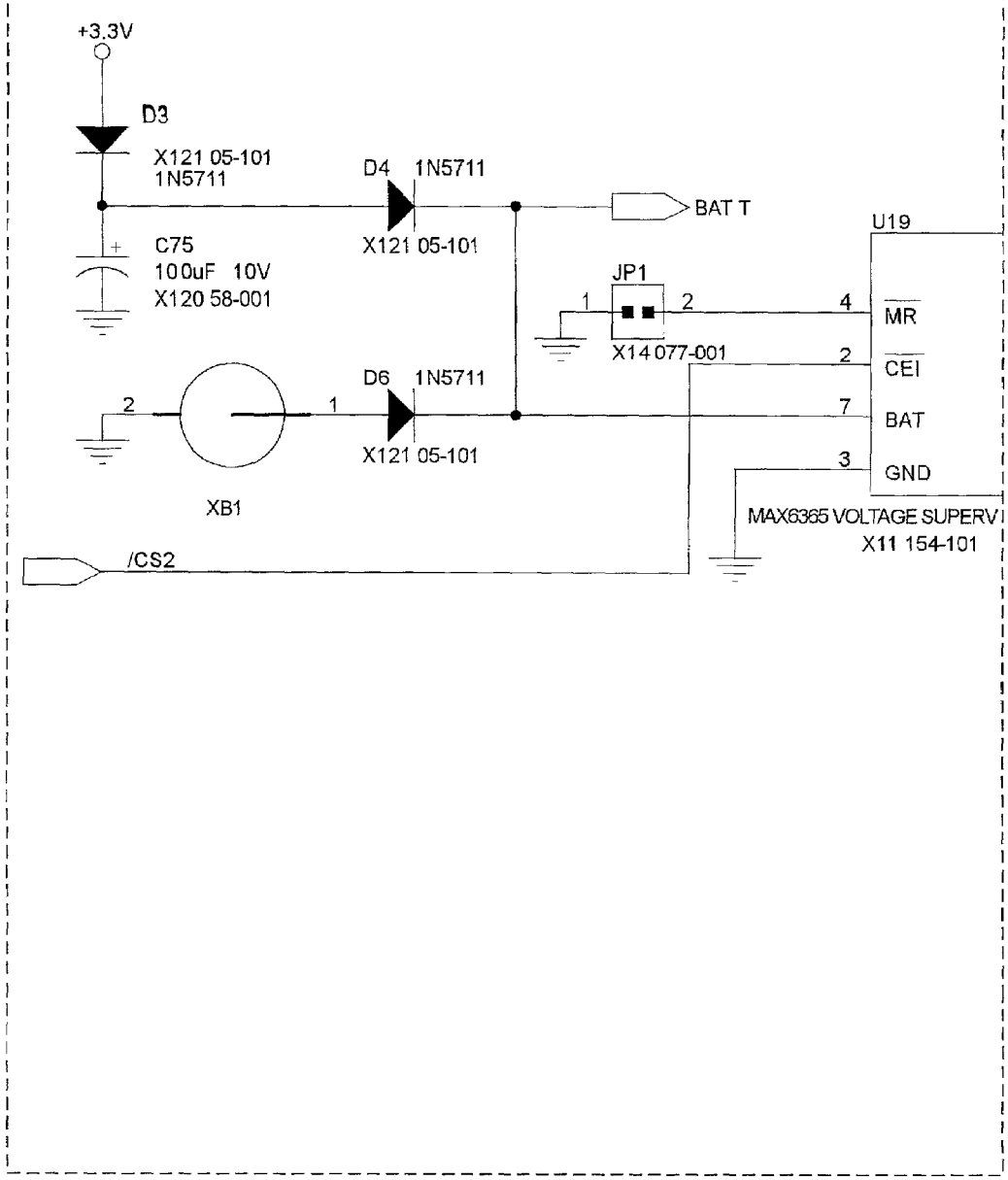
Figure 10C:
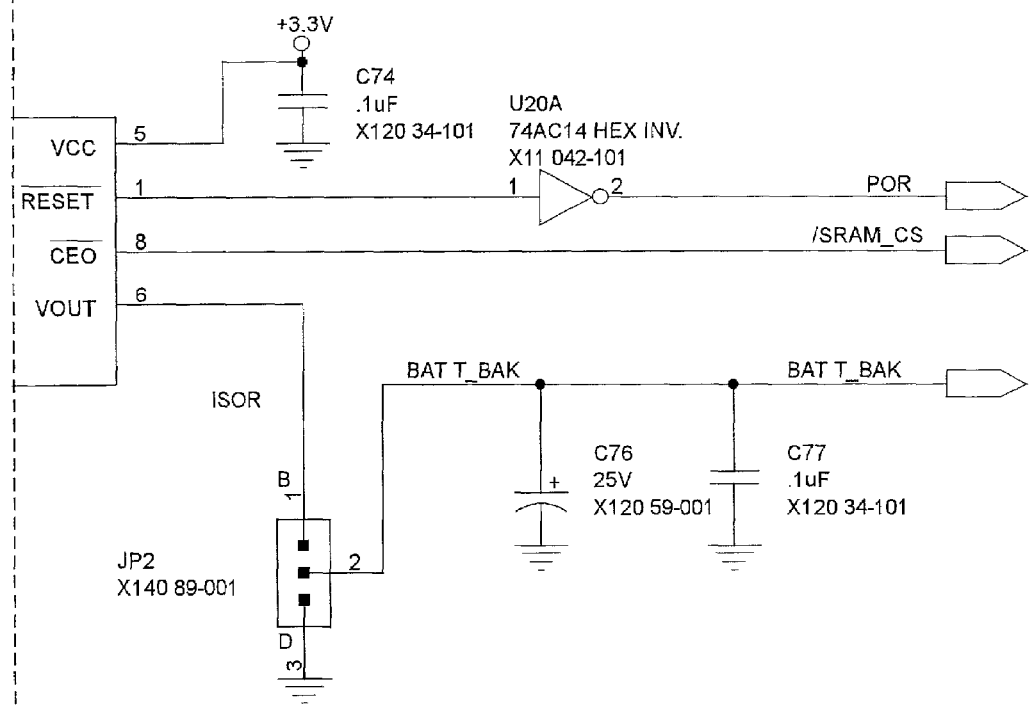
Figure 10D:
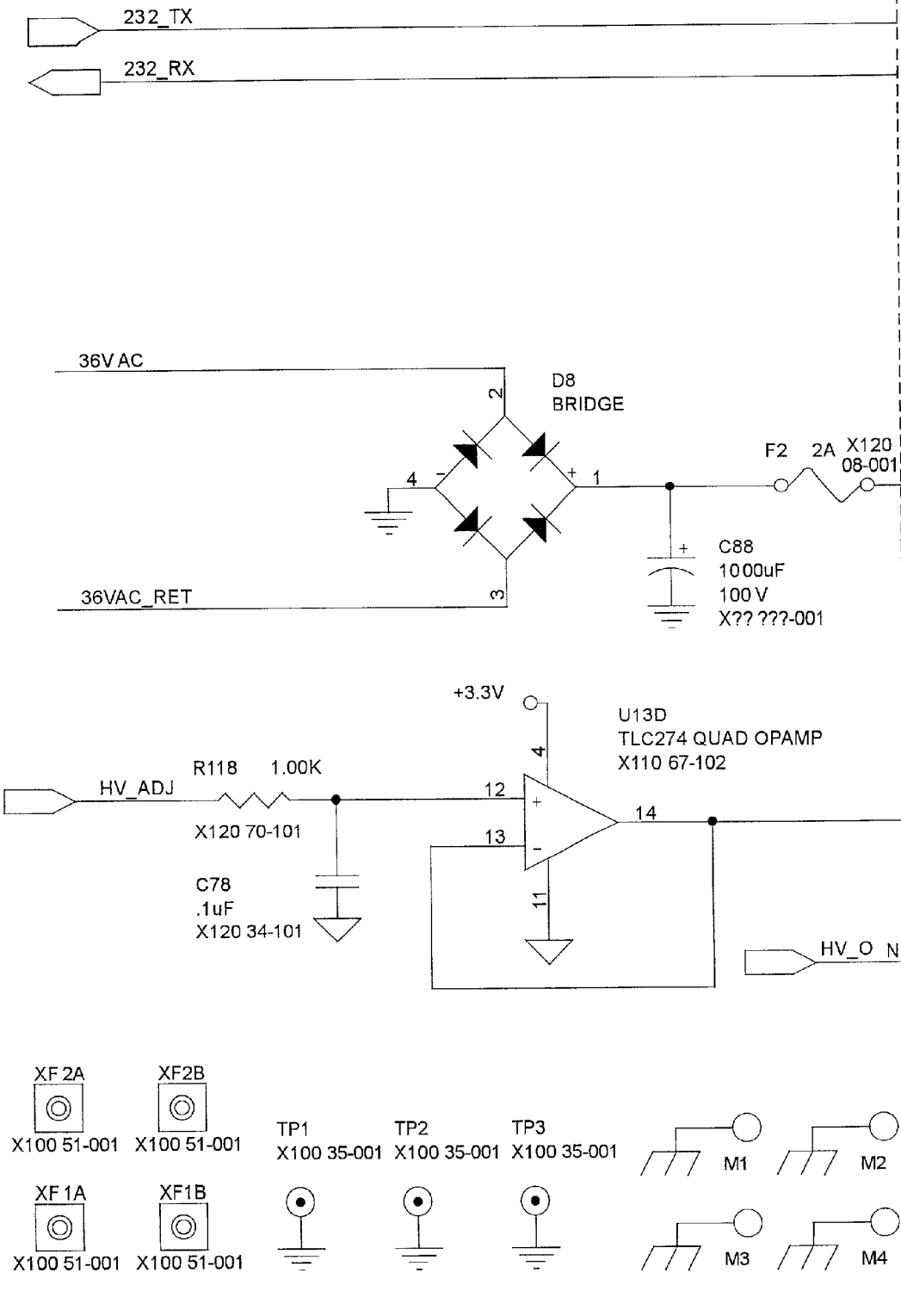
Figure 10F:
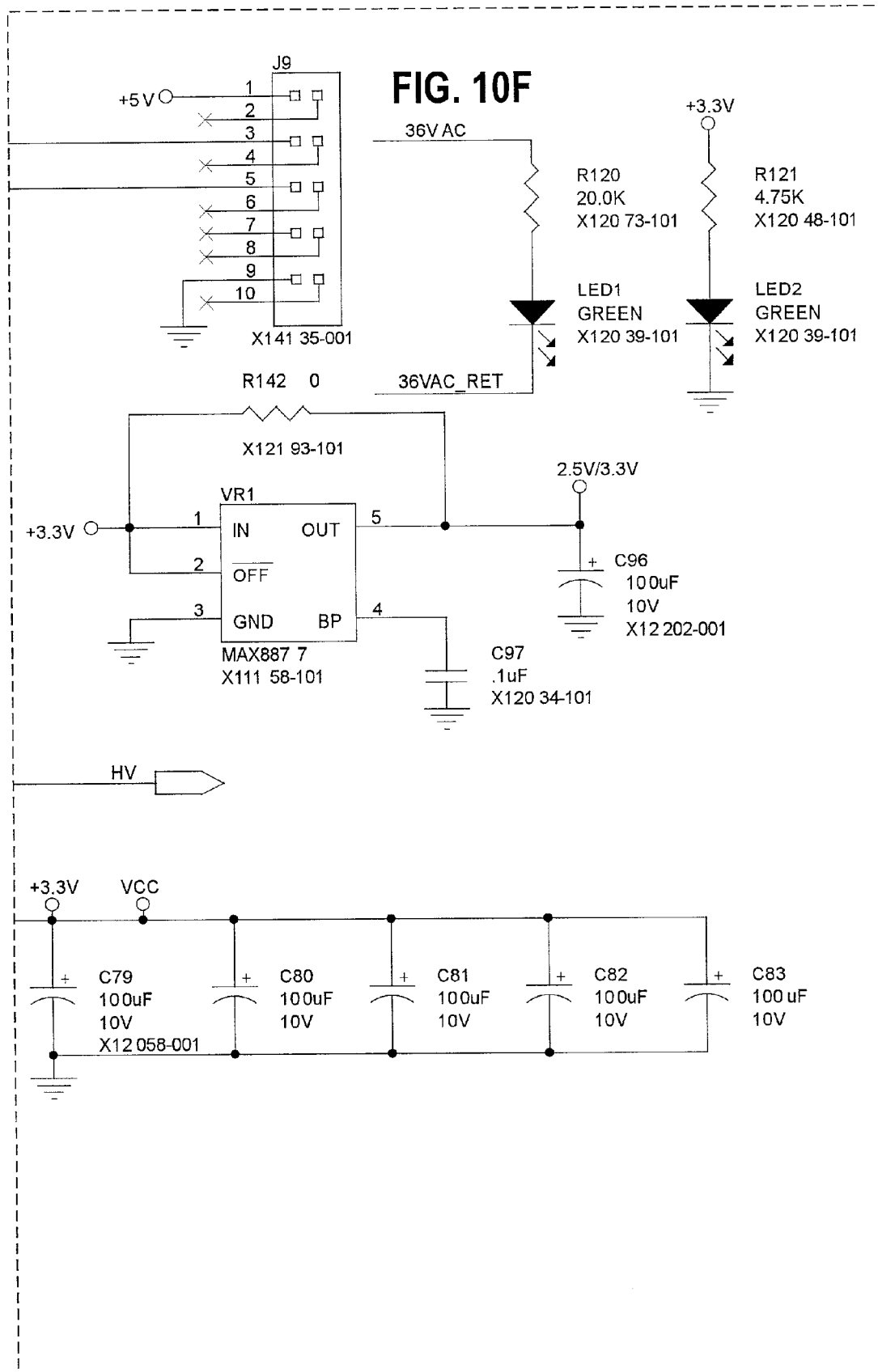

FIG. 9 discloses various circuitry for enabling piezoelectric printer 10 to function in a manner that is well known and standard in the industry. For example, high voltage required by the printhead is created here. This circuitry also calculates when in time to print a message so that the product speed may be synchronized with the printhead using a photo eye, for example. Additionally, for example, standard RS232 communications are performed here.

Preferably, print engine 10 is a self-contained printer, without the need for duplicate control electronics as with conventional multiple printer systems. When print engine 10 is signaled to print, it internally generates the pattern to be printed, similar to Microsoft Windows generating the pixels to display text on a computer monitor. Printer software stores information about the system and the print head, including customer input about print resolution, box size, etc., equivalent to Microsoft Windows' "Print" and "Print setup" dialogs. Print engine 10 has stored fonts and stored messages. Each message is specified as to its font, size and location on the object to be printed. The message may contain variable information such as date, time, expiration, batch number, counters, etc. One message is selected to be the current message for the current production run. An external event, such as a corrugated box blocking a photocell, starts the calculation and printing. For each product that is to receive printed information or coding, print engine 10 checks the current message text, calculates and substitutes the variable information, and uses the resultant text, along with the font, size and location information to generate (e.g.) a pattern of ones and zeros. Print engine 10 also calculates the delay between the photocell and the printer, and the delay from the start of the box, and applies ink to a selected location on the box for each one in the pattern of pixels. This process is then repeated as necessary.

It will now be understood, using the specific embodiment of the apparatus and process described above, that each print engine may be provided with its own unique IP address, such that each print engine becomes an embedded webserver. (An IP or Internet Protocol address is a high-level internetwork address that identifies a specific computer on a subnetwork of interconnected networks; IP addressing is used to forward frames across router boundaries (assuming TCP/IP networks).)

The Internet connectivity of print engines 10 of the present invention permits their access from an Internet browser, for example, which results in a number of advantages. For example, the status of the print engines can be remotely monitored by a server operated by service or manufacturing personnel, for example. Commands can be sent, either by print engine 10 or by the servicing server, for example, and e-mail and pager alerts to or from the embedded server on the print engine may be sent or received. The resulting remote control and remote diagnostic capabilities provides a host of advantages, such as the ability to automatically reorder supplies such as ink when needed, the ability to order printhead replacement, gathering and reporting statistics such as on printer use, allowing users to perform online registration for warranty or other purposes, and scheduling maintenance as required.

Two-way communication is provided, of course, such that service personnel, after being notified by print engine 10 of the need for maintenance, for example, could then notify the consumer using that printer of a scheduled service call in advance of that call, or to confirm an order. This notification could occur by fax or by e-mail, for example, since the service server would know the valid IP address of the customer corresponding to that print engine 10. Software at the servicing server could also be provided which automatically identifies and categorizes the subject matter of the e-mail, for example, and generates purchase and/or shipping orders as required.

Print engine 10 can also monitor and gather data on use and performance history and usage requirements, and report this information to the manufacturer, service personnel, or others. Print engine 10 may also access data from other devices also connected to the Internet, or control or be controlled by such devices, for these and other purposes. Of course, the advantage of a constant communication connection is also provided, as well as communication with both Intranet and Internet sources and connected devices. Still further, overhead costs are saved by the elimination of redundant control electronics, as with conventional, multiple-printer systems. Integrated control electronics also enables reduced printer size, enabling the more efficient use of work space.

The above description is not intended to limit the meaning of the words used in the following claims that define the invention. For example, it will be easily recognized that the principles of the present invention are applicable to printers other than impulse-type ink jet printers, including wax printers and continuous ink jet printers using fast-drying inks, printers using jet fluids other than ink (e.g., DNA reagents printed onto slides, printing LEDs, etc.), and printheads other than piezoelectronic ones (e.g., valve jet printheads, printheads using electrostatics, etc.). Rather, it is contemplated that future modifications in structure, function or result will exist that are not substantial changes and that all such insubstantial changes in what is claimed are intended to be covered by the claims.

We claim:

1. An ink jet print engine with Internet connectivity, comprising:
   printer hardware and software providing a functioning printer, including a piezoelectric printhead for dispensing ink onto a substrate; and
   Internet hardware and software for providing the print engine with Internet connectivity, including a microprocessor communicating with the printer hardware and software, the microprocessor comprising an embedded server having a valid IP address, said microprocessor also containing Ethernet MAC and system controllers;
   and wherein the printer software stores one or more valid IP addresses of servers corresponding to maintenance or service centers for one or more components of the print engine.

2. The ink jet print engine of claim 1 wherein said printer hardware or software is capable of providing diagnostic information.

3. The ink jet print engine of claim 1 wherein the system controllers include memory, DMA, interrupts and timers.

4. The ink jet print engine of claim 1 wherein the microprocessor uses an RTOS operating system.

5. The ink jet print engine of claim 1 wherein said printer contains integrated networking software.

6. An ink jet print engine with Internet connectivity, comprising:
- printer hardware and software providing a functioning printer, including a piezoelectric printhead for dispensing ink onto a substrate; and
- Internet hardware and software for providing the print engine with Internet connectivity, including a microprocessor communicating with the printer hardware and software, the microprocessor comprising an embedded server having a valid IP address, said microprocessor also containing Ethernet MAC and system controllers;
- and wherein the system controllers include memory, DMA, interrupts and timers.

7. The ink jet print engine of claim 6 wherein the printer software stores one or more valid IP addresses of servers corresponding to maintenance or service centers for one or more components of the print engine.

8. The ink jet print engine of claim 6 wherein said printer hardware or software is capable of providing diagnostic information.

9. The ink jet print engine of claim 6 wherein the microprocessor uses an RTOS operating system.

10. The ink jet print engine of claim 6 wherein said printer contains integrated networking software.

11. An ink jet print engine with Internet connectivity, comprising:
- printer hardware and software providing a functioning printer, including a piezoelectric printhead for dispensing ink onto a substrate; and
- Internet hardware and software for providing the print engine with Internet connectivity, including a microprocessor communicating with the printer hardware and software, the microprocessor comprising an embedded server having a valid IP address, said microprocessor also containing Ethernet MAC and system controllers;
- and wherein said microprocessor gathers statistics concerning said printer device.

12. The ink jet print engine of claim 11 wherein the printer software stores one or more valid IP addresses of servers corresponding to maintenance or service centers for one or more components of the print engine.

13. The Ink jet print engine of claim 11 wherein said printer hardware or software is capable of providing diagnostic information.

14. The ink jet print engine of claim 11 wherein the microprocessor uses an RTOS operating system.

15. The ink jet print engine of claim 11 wherein said printer contains integrated networking software.

16. An ink jet print engine with Internet connectivity, comprising:
- printer hardware and software providing a functioning printer, including a piezoelectric printhead for dispensing ink onto a substrate; and
- Internet hardware and software for providing the print engine with Internet connectivity, including a microprocessor communicating with the printer hardware and software, the microprocessor comprising an embedded server having a valid IP address, said microprocessor also containing Ethernet MAC and system controllers;
- and wherein said microprocessor sends or receives Email from a remote server.

17. The ink jet print engine of claim 16 wherein said printer hardware or software is capable of providing diagnostic information.

18. The ink jet print engine of claim 16 wherein the printer software stores one or more valid IP addresses of servers corresponding to maintenance or service centers for one or more components of the print engine.

19. The ink jet print engine of claim 16 wherein said Email is related to diagnostics.

20. The ink jet print engine of claim 16 wherein said processor contains a real-time operating system.

* * * * *